(12) United States Patent
Leung et al.

(10) Patent No.: US 8,786,568 B2
(45) Date of Patent: *Jul. 22, 2014

(54) DISAPPEARING BUTTON OR SLIDER

(71) Applicant: Apple Inc., Cupertino, CA (US)

(72) Inventors: Omar S. Leung, Palo Alto, CA (US);
David T. Amm, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/888,579

(22) Filed: May 7, 2013

(65) Prior Publication Data

US 2013/0241877 A1 Sep. 19, 2013

Related U.S. Application Data

(63) Continuation of application No. 12/257,956, filed on Oct. 24, 2008, now Pat. No. 8,436,816.

(51) Int. Cl.
*G06F 3/041* (2006.01)

(52) U.S. Cl.
USPC .......................................... 345/173; 345/178

(58) Field of Classification Search
CPC ..... G06F 3/044; G06F 3/03547; G06F 1/169; G06F 1/1616
USPC ................ 345/156–184; 324/669; 361/679.3, 361/679.4, 681, 752; 340/5, 54
See application file for complete search history.

(56) References Cited

U.S. PATENT DOCUMENTS

| | | | |
|---|---|---|---|
| 4,844,072 A * | 7/1989 | French et al. ................. 607/104 |
| 5,992,240 A | 11/1999 | Tsuruoka et al. | |
| 6,279,253 B1 | 8/2001 | Inbar et al. | |
| 6,388,660 B1 * | 5/2002 | Manser et al. ................ 345/173 |
| 6,788,295 B1 * | 9/2004 | Inkster .......................... 345/175 |
| 6,791,531 B1 * | 9/2004 | Johnston et al. .............. 345/157 |
| 7,129,943 B2 * | 10/2006 | Zhang et al. .................. 345/426 |
| 7,230,610 B2 | 6/2007 | Jung et al. | |
| 7,324,095 B2 | 1/2008 | Sharma | |
| 7,889,176 B2 * | 2/2011 | Harley et al. ................. 345/157 |
| 7,898,523 B1 * | 3/2011 | Van Meter .................... 345/158 |
| 7,907,394 B2 | 3/2011 | Richardson et al. | |
| 7,911,455 B2 * | 3/2011 | Nishikawa et al. ........... 345/173 |
| 8,014,155 B2 | 9/2011 | Kanayama et al. | |
| 8,035,621 B2 * | 10/2011 | Joo et al. ....................... 345/173 |
| 8,072,442 B2 * | 12/2011 | Castagner et al. ............ 345/175 |
| 8,212,771 B1 * | 7/2012 | Sanchez-Garcia ............ 345/161 |
| 8,436,816 B2 | 5/2013 | Leung et al. | |
| 2002/0024713 A1 | 2/2002 | Roberts et al. | |
| 2002/0046353 A1 | 4/2002 | Kishimoto | |
| 2003/0025668 A1 * | 2/2003 | Lin ............................... 345/156 |
| 2005/0069695 A1 | 3/2005 | Jung et al. | |
| 2005/0190040 A1 | 9/2005 | Huntzicker et al. | |
| 2007/0165002 A1 * | 7/2007 | Wassingbo .................... 345/169 |
| 2007/0184727 A1 | 8/2007 | Kanayama et al. | |
| 2007/0192692 A1 | 8/2007 | Chen et al. | |

(Continued)

*Primary Examiner* — Prabodh M Dharia
(74) *Attorney, Agent, or Firm* — Brownstein Hyatt Farber Schreck, LLP

(57) ABSTRACT

An input device receives an input that is a deflection based capacitive sensing input. Deflection of a metal frame of the input device causes a change in capacitance that is used to control a function of an electrical device. The input appears invisible because it is made of the same material as the housing it is contained in. Invisible backlit holes may make the input selectively visible or invisible to the user.

20 Claims, 23 Drawing Sheets

(56) References Cited

U.S. PATENT DOCUMENTS

| | | |
|---|---|---|
| 2007/0205776 A1* | 9/2007 | Harish et al. .................. 324/662 |
| 2007/0242037 A1 | 10/2007 | Son |
| 2008/0024470 A1 | 1/2008 | Andre et al. |
| 2008/0084404 A1 | 4/2008 | Andre et al. |
| 2009/0009945 A1 | 1/2009 | Johnson et al. |
| 2009/0140871 A1* | 6/2009 | Titus .............................. 340/638 |
| 2009/0201263 A1* | 8/2009 | Hofmann ....................... 345/173 |
| 2010/0109999 A1 | 5/2010 | Qui |
| 2010/0164836 A1* | 7/2010 | Liberatore ..................... 345/1.1 |
| 2010/0321249 A1 | 12/2010 | Chiang et al. |
| 2011/0038114 A1 | 2/2011 | Pance et al. |
| 2011/0043227 A1* | 2/2011 | Pance et al. ................... 324/681 |

* cited by examiner

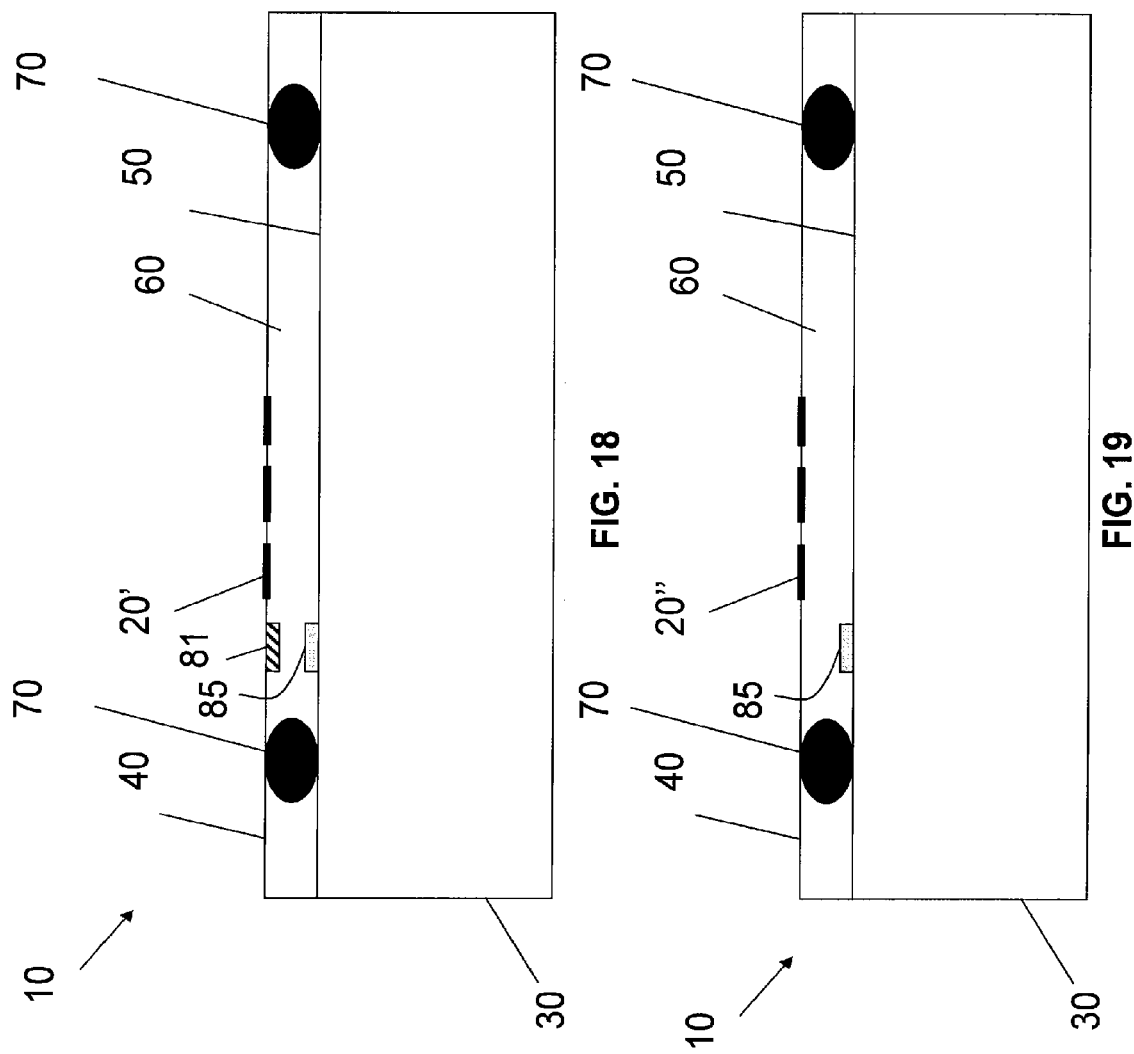

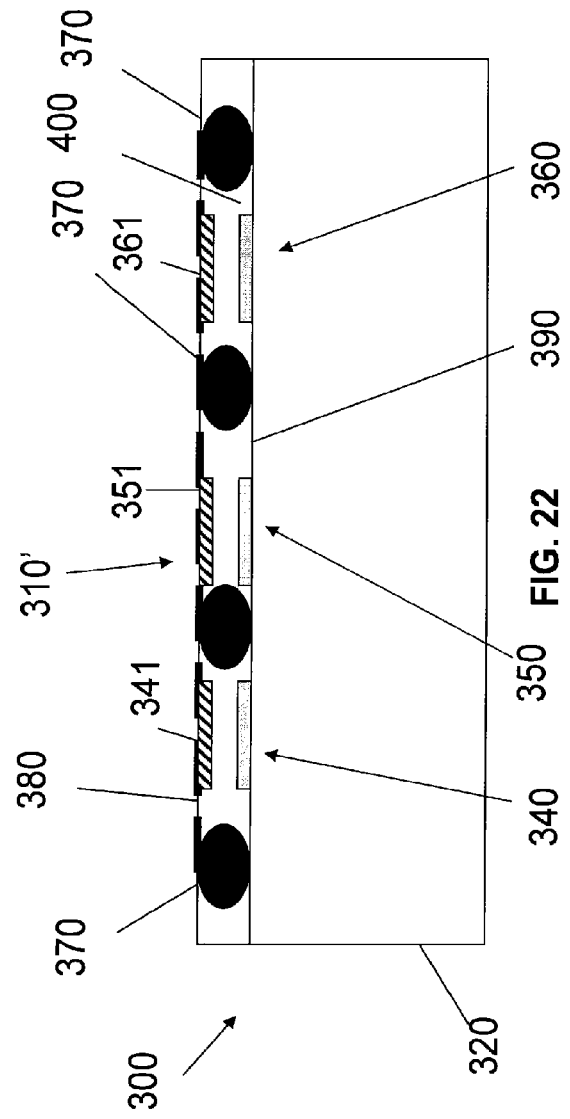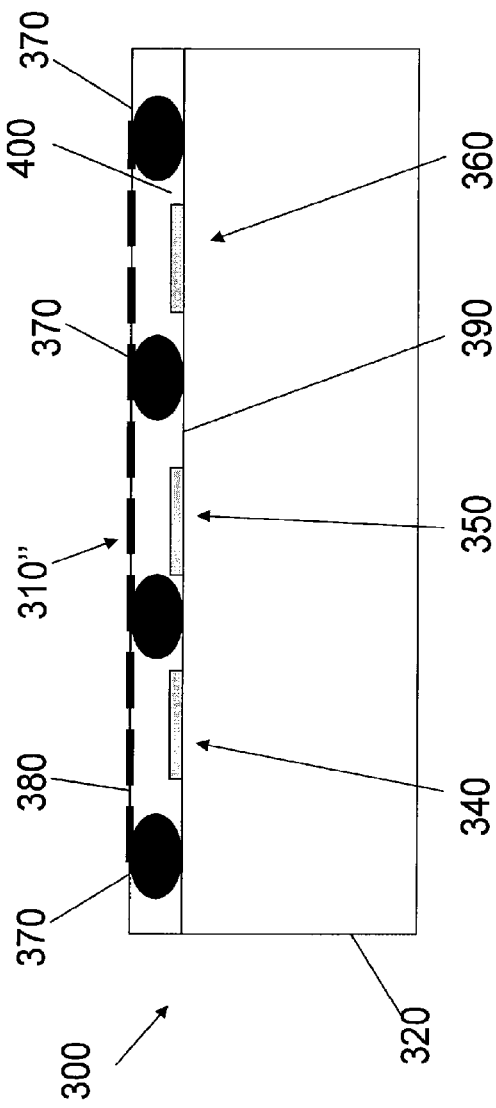

DISAPPEARING BUTTON OR SLIDER

CROSS-REFERENCE TO RELATED APPLICATIONS

This application is a continuation of U.S. patent application Ser. No. 12/257,956, entitled "Disappearing Button or Slider", filed on filed Oct. 24, 2008, now U.S. Pat. No. 8,436,816, which is incorporated by reference in its entirety as if fully disclosed herein.

This application is related to U.S. patent application Ser. No. 11/551,988 filed Oct. 30, 2006, titled "INVISIBLE, LIGHT-TRANSMISSIVE DISPLAY SYSTEM," and assigned to the assignee of the present application. The Ser. No. 11/551,988 application is a continuation-in-part of U.S. patent application Ser. No. 11/456,833 filed Jul. 11, 2006 titled "INVISIBLE, LIGHT-TRANSMISSIVE DISPLAY SYSTEM," and assigned to the assignee of the present application. The Ser. No. 11/551,988 and the Ser. No. 11/456,833 applications are both herein incorporated in their entirety by reference thereto.

BACKGROUND OF THE INVENTION

1. Field of the Invention

The present invention relates generally to input devices and device display systems, and more particularly to invisible input systems and device display systems. The input devices and display systems may become visible when illuminated from behind through invisible holes.

2. Background Art

In the world of consumer devices, and particularly consumer electronics, there is an ever-present demand for improved appearance, improved functionality, and improved aesthetics. Industrial design has become a highly skilled profession that focuses on fulfilling this need for enhanced consumer product appearance, functionality, and aesthetics.

One area that receives attention for improvement, particularly in consumer electronics, is user input and interface. Presently there exists a range of mechanically actuated (e.g., buttons, switches, levers, keys, keyboards, dials, click wheels, scroll wheels, and the like) or electrically actuated (e.g., touch pads, track pads, touch screens, multi-touch screens, and the like) input devices. These input devices interface with their associated electronic devices (e.g., computers, laptop computers, media devices, mobile phones, calculators, medical devices, etc. . . . ) in order to control a function of the device, for example, turn the device on or off, open a menu, move a cursor and so forth.

One challenge with these known input devices is that they may detract from the aesthetics of the device by interrupting the continuity of the device housing. To illustrate, compare a mobile phone having a traditional key pad with the iPhone produced by Apple Inc. of Cupertino, Calif. The iPhone has a flat touch-sensitive screen which presents a striking, seamless design, while the traditional mobile phone presents a cluttered array of keys and buttons. Besides the obvious aesthetic advantages of having a seamless design, a seamless design may have improved functionality and/or durability. For example, a traditional mechanical key pad can wear out over time and/or be ruined by dirt or moisture entering into the openings in the device housing. These openings are necessary to accommodate the traditional keys and buttons.

The iPhone touch screen uses capacitive sensing. This type of sensing takes advantage of the fact that two electrical fields separated by a dielectric produce capacitance. In the iPhone, a first electrical field is produced inside the iPhone by an array of electrodes. The second electrical field is provided by the user's finger. When the finger interacts with the glass touch surface a circuit inside the iPhone detects a change in capacitance and processes this change in order to compute, for example, the location and speed of the scrolling finger. Some modern track pads on laptop computers may function in a similar way, but normally have plastic or rubber track surfaces. In all of these devices the housing of the device is normally metal, while the track surface is normally a dielectric material such as rubber, plastic, or glass. Therefore, a truly seamless design has been impossible. Furthermore, a glass surface may be fragile.

Taken to its extreme, seamless design would have an invisible input. Since a metal housing is advantageous for aesthetic, environmental, and manufacturing reasons, this presents a particular challenge. One method to overcome this challenge is to include a plastic input painted to look like metal. However, this will not match the metal look and finish exactly, so the truly seamless design is not realized.

Another area that continually receives great attention for improvement is user displays. Providing crisp, attractive, unambiguous, and intuitively friendly displays and information for the user is very important in many consumer products. However, as consumer products constantly become smaller and smaller, and in some cases more and more complex, it becomes increasingly difficult to present and display user information in a manner that is easy for the user to grasp and understand, but is also in an uncluttered form and appearance that is aesthetically pleasing.

Much of the aesthetic appeal of a consumer product can quickly be compromised if there are too many display elements, or if too much display area is occupied by display elements that are not needed except at particular times. When not needed, these "passive" or unactivated display elements invariably remain visible to the user, even though they are in the "off" state. This is not only displeasing from an aesthetic standpoint, but it can be an annoying distraction that interferes with detection and understanding of other display elements that need to be observed at a given moment.

Illuminating display elements is known. Some display elements are illuminated continuously; others are illuminated only when appropriate to instruct and guide the user. Display elements that are not continuously illuminated can still be distracting, or at least aesthetically objectionable, when not illuminated (when in the off state) because they may still remain visible in the display area.

For example, one typical such display element is configured from transparent plastic inserts that penetrate through the metallic case of an electronic device, and are smoothly flush with the outer surface of the case. A large number of such always-visible display elements leads to a cluttered, confusing, and unattractive appearance. In fact, even a single such element, when not illuminated (i.e., in an inactive state), can become an unattractive distraction on an otherwise smooth and attractive surface.

Less expensive device housings, for example, those made of opaque plastic rather than metal, are often similarly provided with transparent plastic inserts for illuminated display elements. These display elements also conflict with a good aesthetic appearance when they are not illuminated. Also, displays using plastic or glass are less durable than metal and are more subject to breaking or cracking.

Additionally, the separate visible inserts utilized by prior techniques sometimes do not fit perfectly in the holes in which they are inserted or formed. Such imperfect fit can invite entry of liquids, dirt, and the like, undesirably causing yet another disadvantage.

Thus, the need exists for commercially feasible device display systems with improved aesthetics that unobtrusively furnish information as appropriate, but otherwise do not distract or detract from the user's experience or the device's performance. Preferably, selected elements of such display systems would additionally become invisible in their off states.

In view of ever-increasing commercial competitive pressures, increasing consumer expectations, and diminishing opportunities for meaningful product differentiation in the marketplace, it is increasingly critical that answers be found to these challenges. Moreover, the ever-increasing need to save costs, improve efficiencies, improve performance, and meet such competitive pressures adds even greater urgency to the critical necessity that answers be found.

BRIEF SUMMARY OF THE INVENTION

The invention relates in one embodiment an electronic device having an invisible input. The device has a frame having a top face with invisible holes formed therein. A capacitor reference is on an inner surface of the top face in the area of the invisible holes. An interior wall is separated from the top face and forms an interior space having a dielectric medium disposed therein. A capacitor plate is disposed on a surface of the interior wall opposite the first capacitor plate. A light source is disposed in the interior space and is configured to shine through the invisible holes. A capacitor sensor is electrically connected to the capacitive reference and the capacitor plate. When an object is placed on the frame in the area of the invisible holes and pressure is applied, the frame deforms. This deformation causes a change in capacitance between the capacitive reference and the capacitor plate. The capacitor sensor detects this change and converts it to an electrical signal.

The invention relates in another embodiment to an invisible input. The invisible input has a frame having a top face with invisible holes formed therein. A capacitor reference is on an inner surface of the top face in the area of the invisible holes. An interior wall is separated from the top face and forms an interior space having a dielectric medium disposed therein. A capacitor plate is disposed on a surface of the interior wall opposite the first capacitor plate. A light source is disposed in the interior space and is configured to shine through the invisible holes. A capacitor sensor is electrically connected to the capacitive reference and the capacitor plate. When an object is placed on the frame in the area of the invisible holes and pressure is applied, the frame deforms. This deformation causes a change in capacitance between the capacitive reference and the capacitor plate. The capacitor sensor detects this change and converts it to an electrical signal.

BRIEF DESCRIPTION OF THE DRAWINGS/FIGURES

Certain embodiments of the invention have other aspects in addition to or in place of those mentioned above. The aspects will become apparent to those skilled in the art from a reading of the following detailed description when taken with reference to the accompanying drawings. The present invention is illustrated by way of example, and not by way of limitation, in the figures of the accompanying drawings and in which like reference numerals refer to similar elements and in which.

Figure 1:
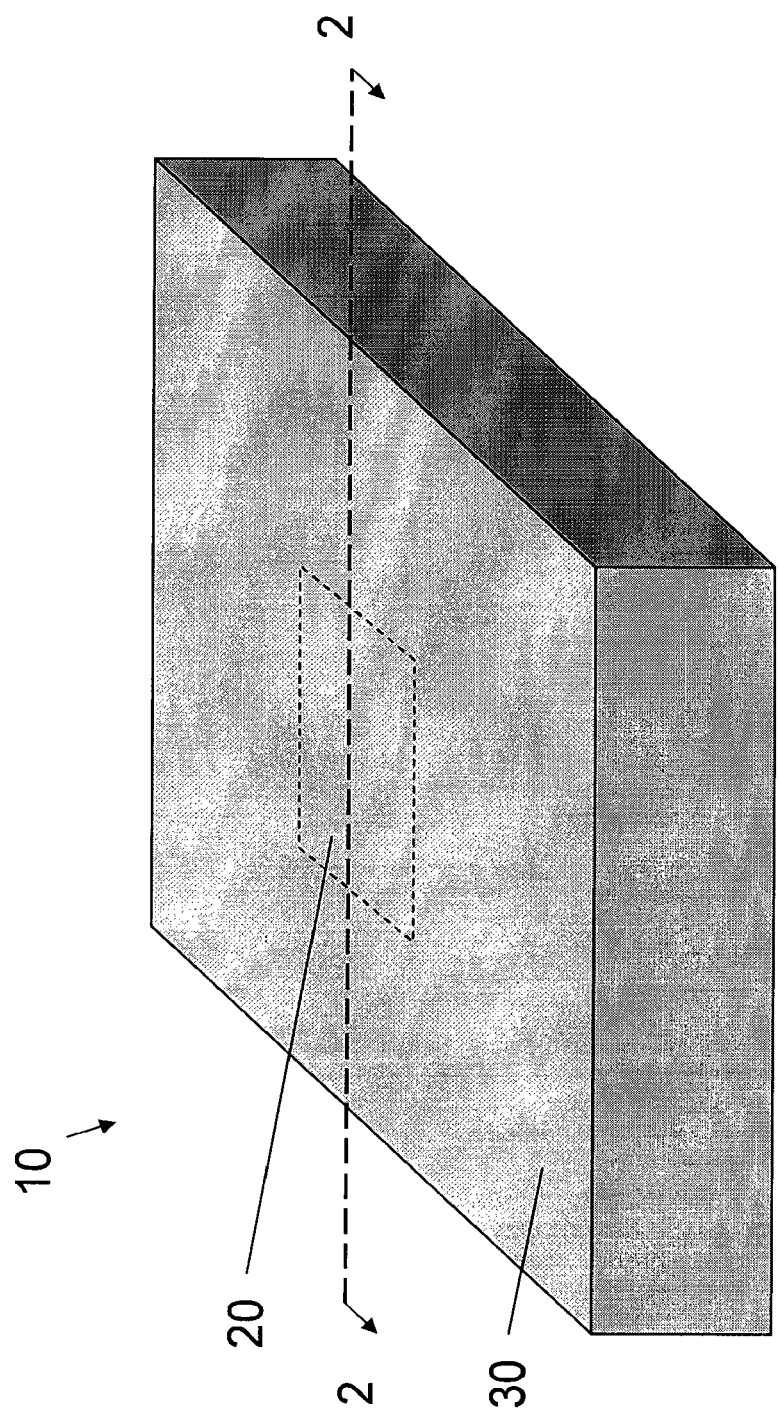
FIG. 1 is a perspective view of an electronic device according to the present invention.
Figure 4:
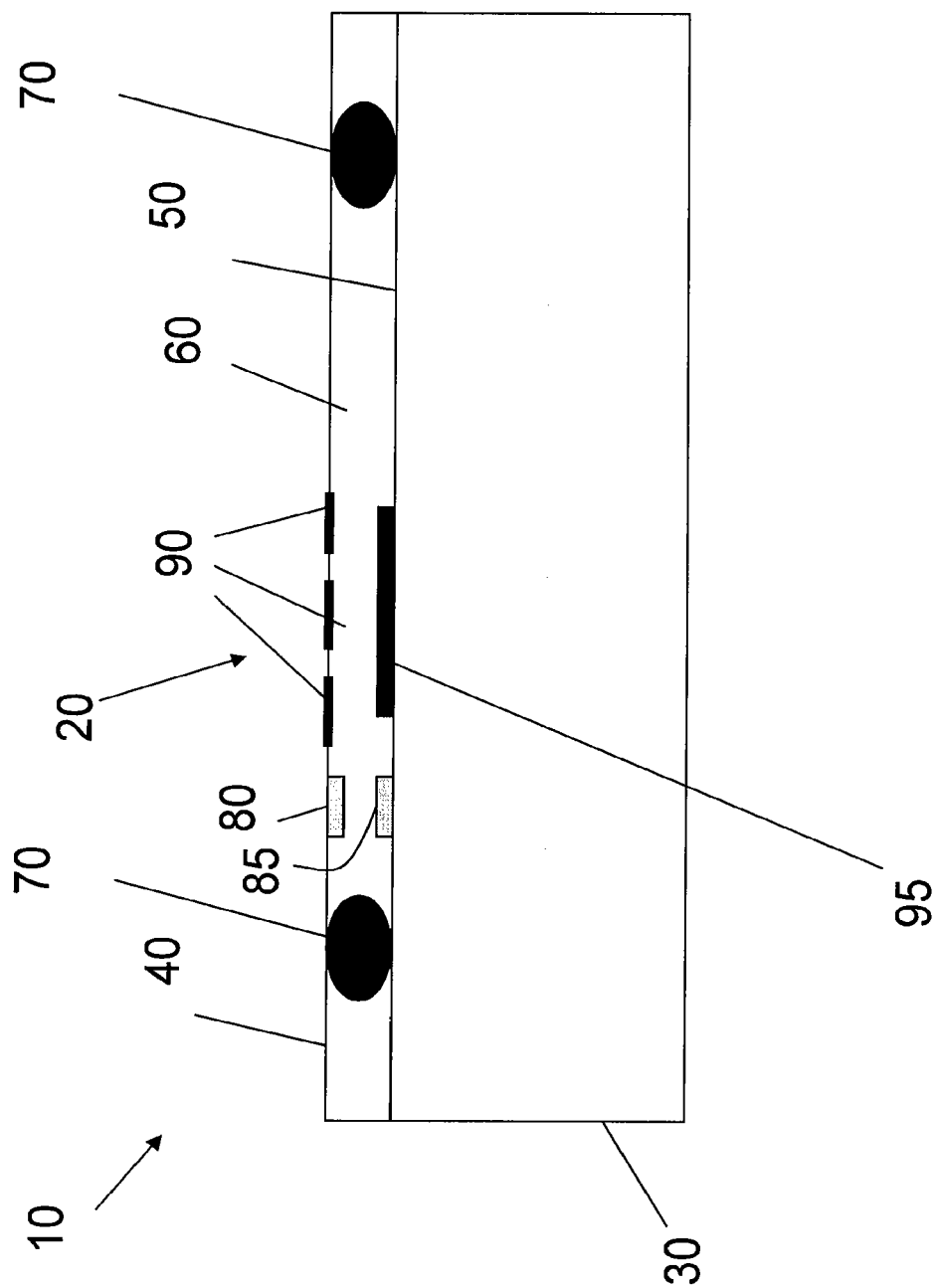
Figure 5A:
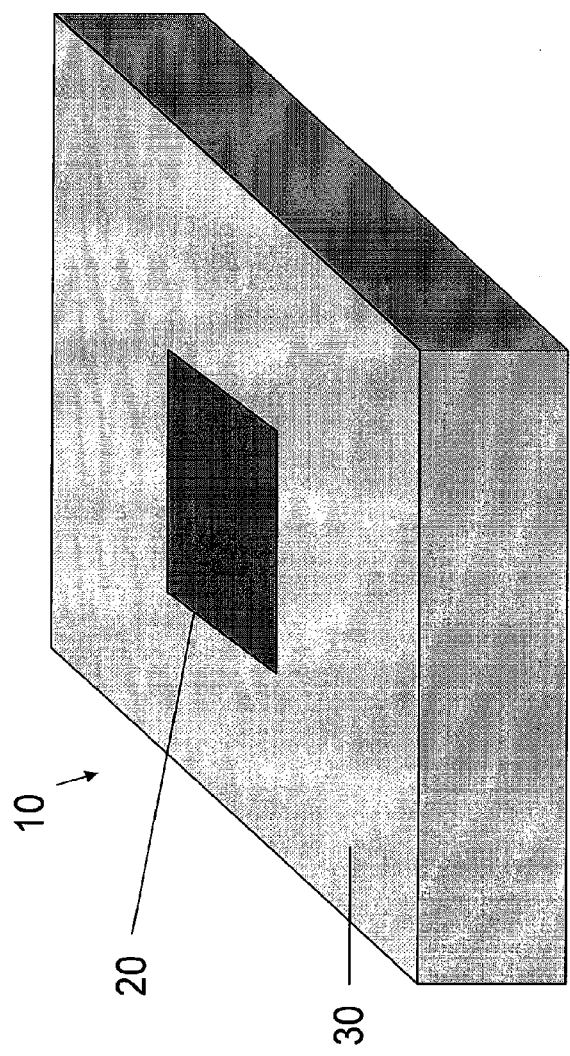
Figure 5B:
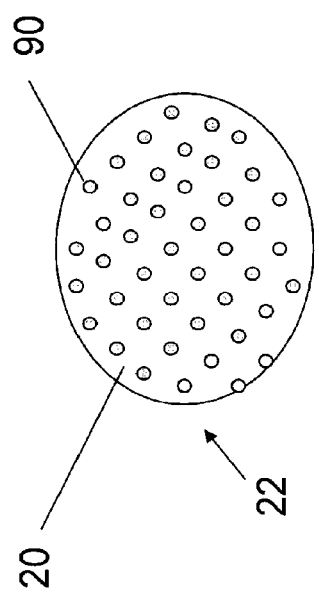
Figure 6:
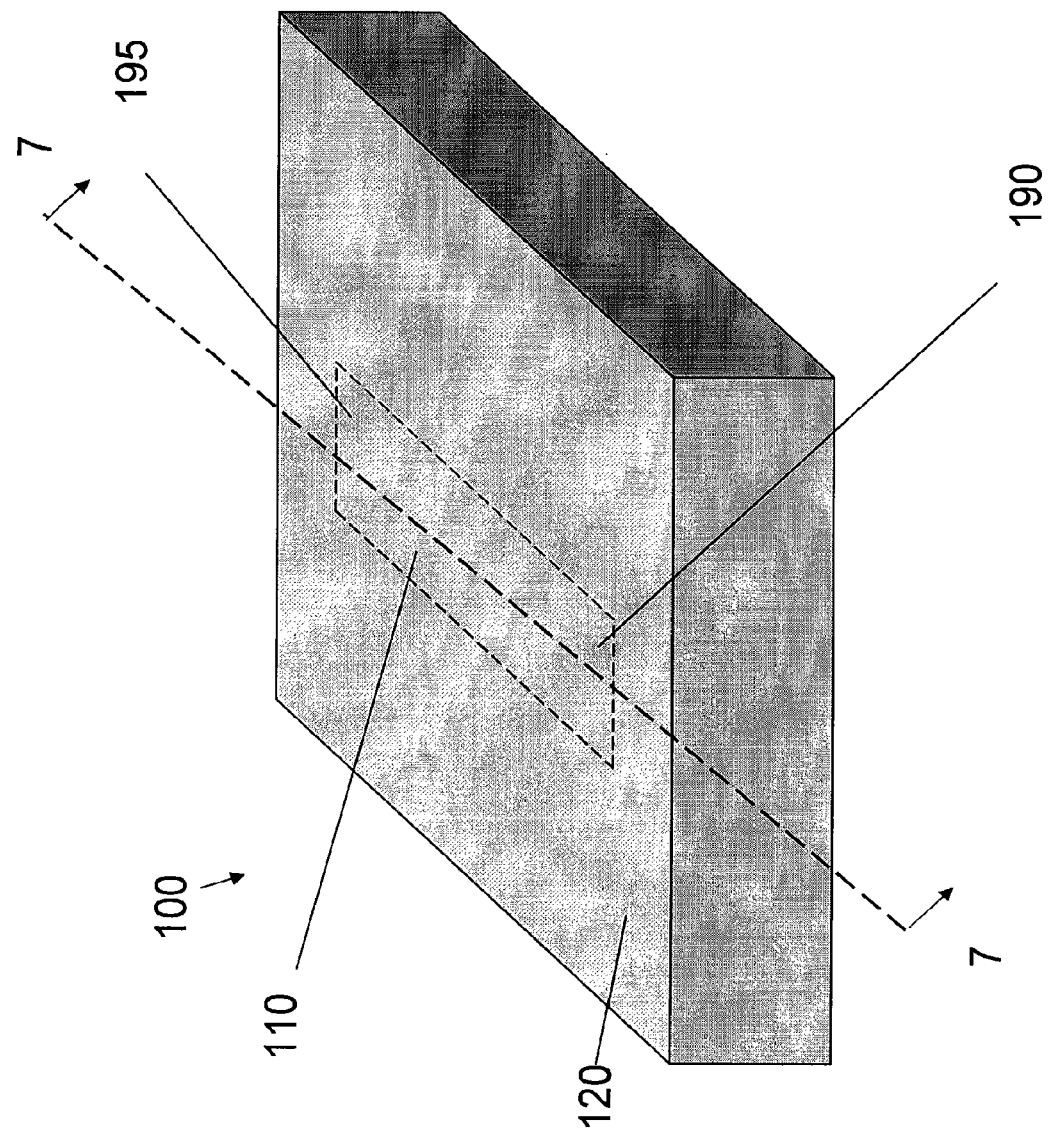
Figure 7:
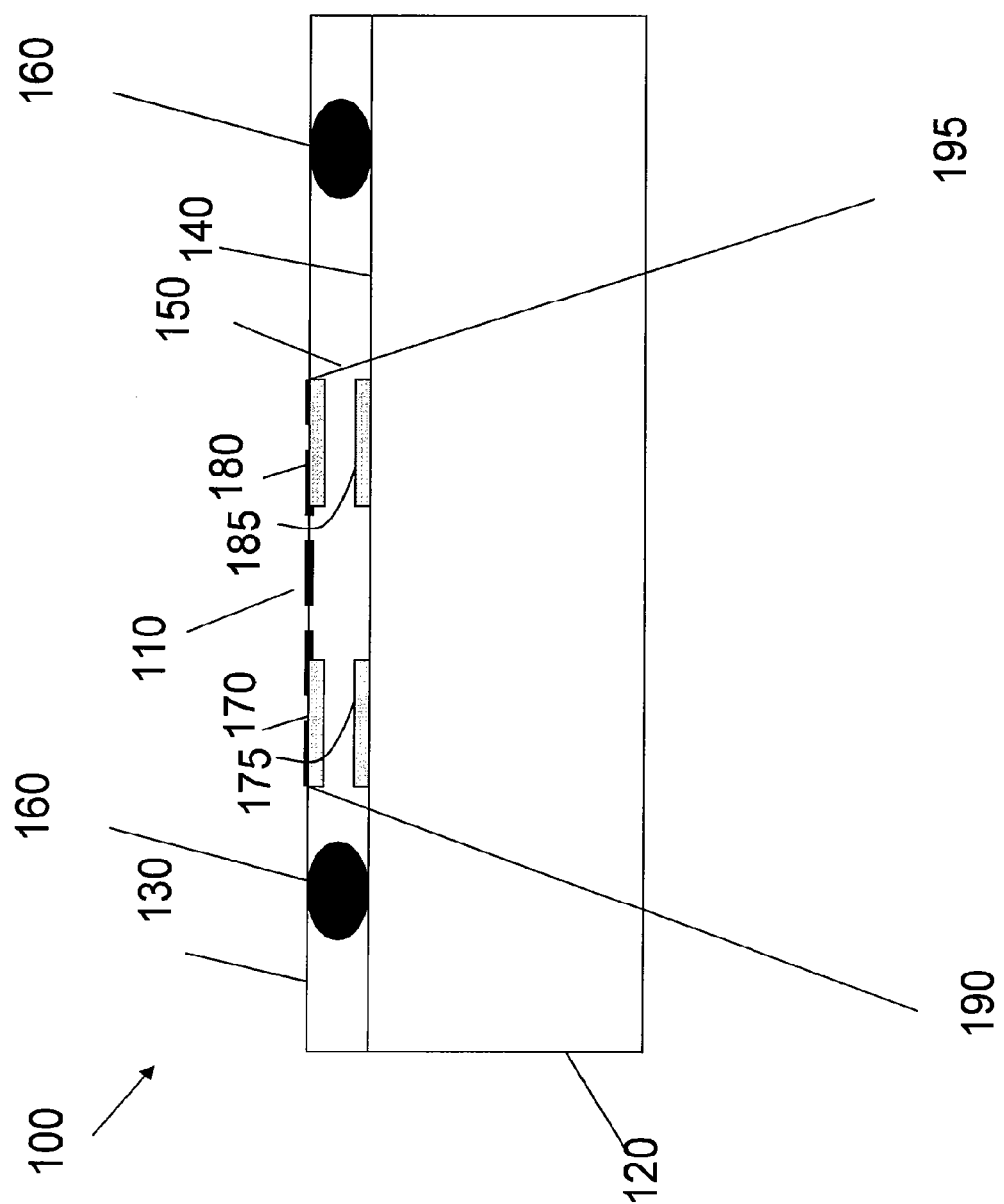
Figure 8:
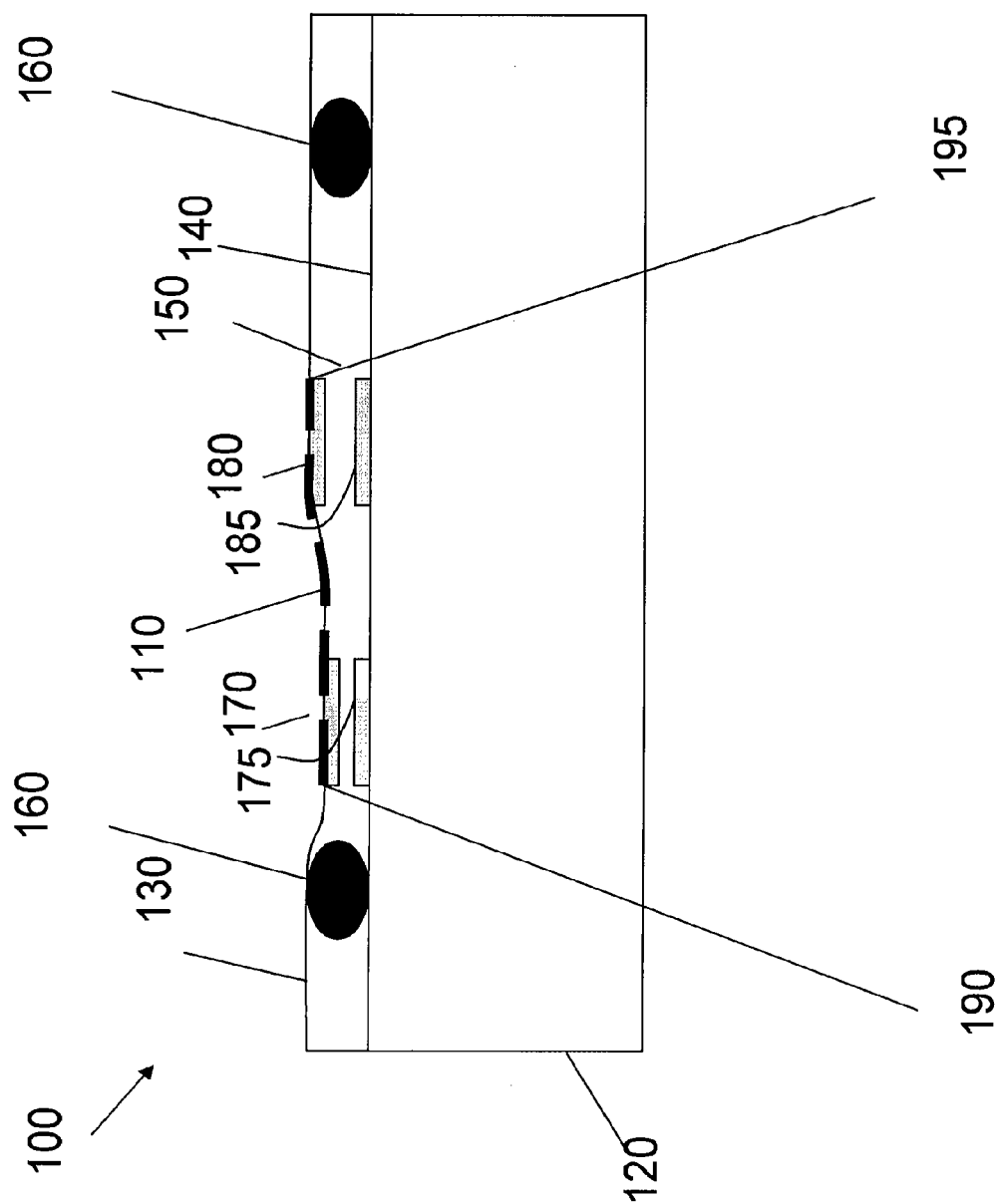
Figure 9:
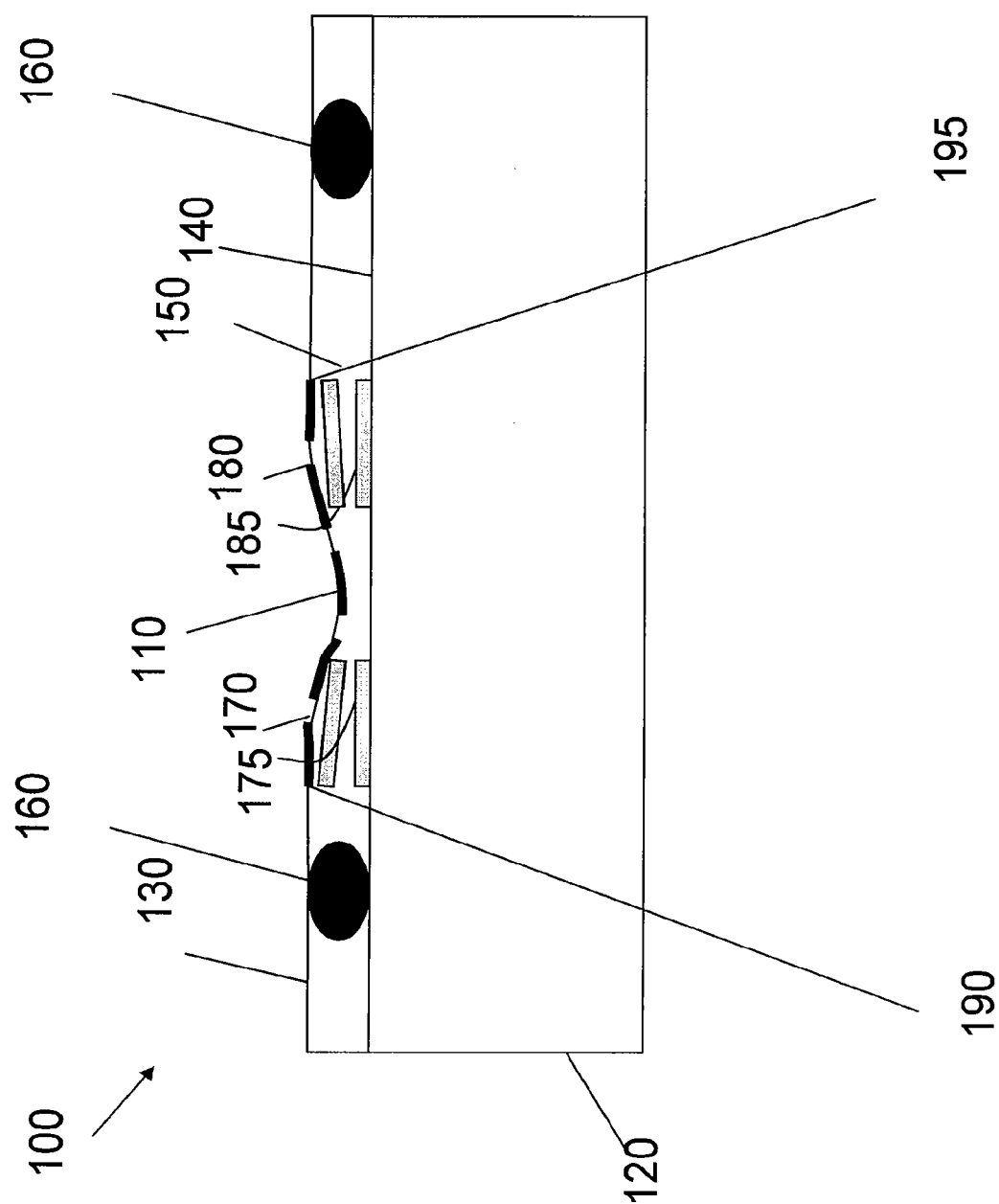
Figure 10:
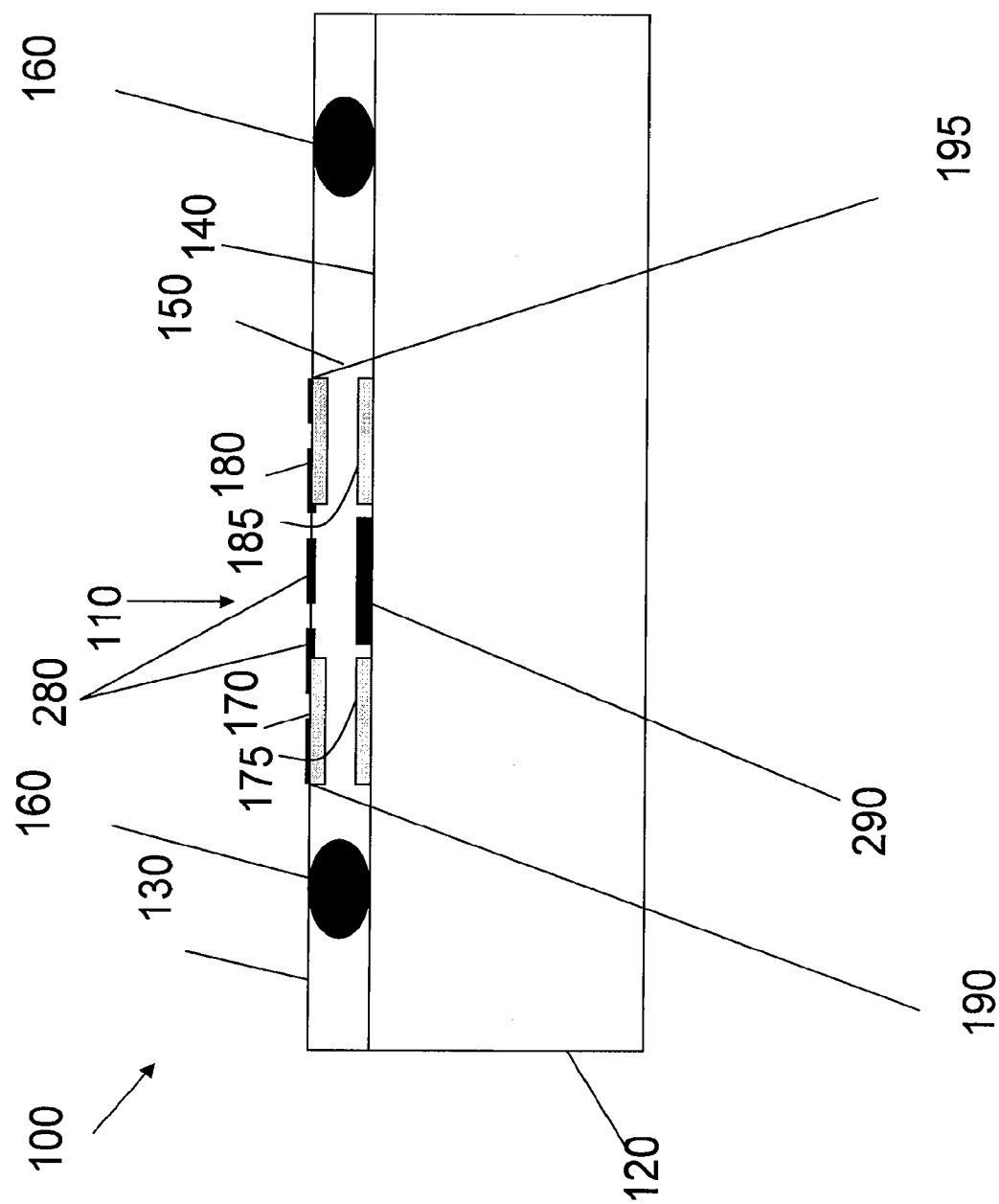
Figure 11:
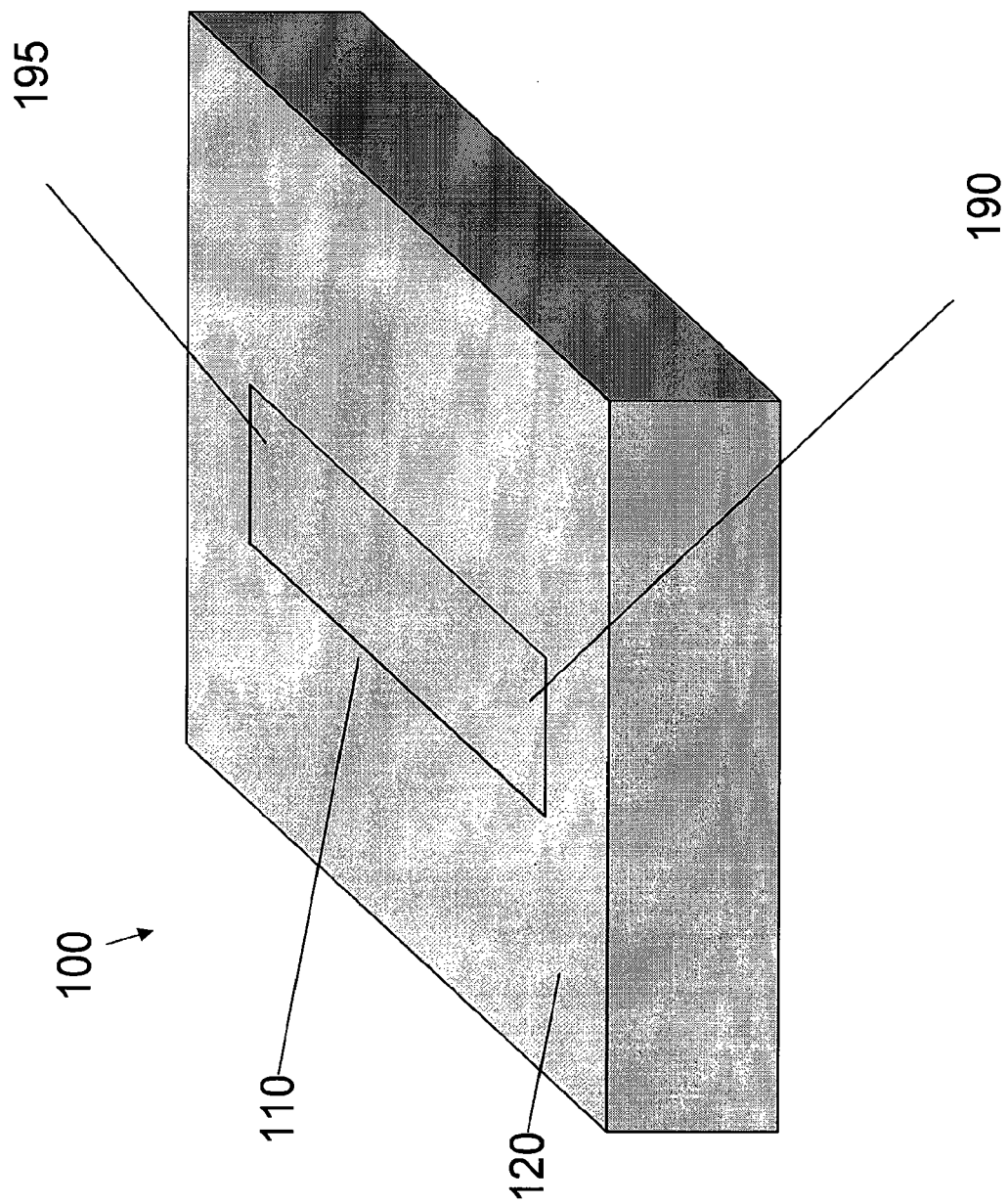
Figure 12:
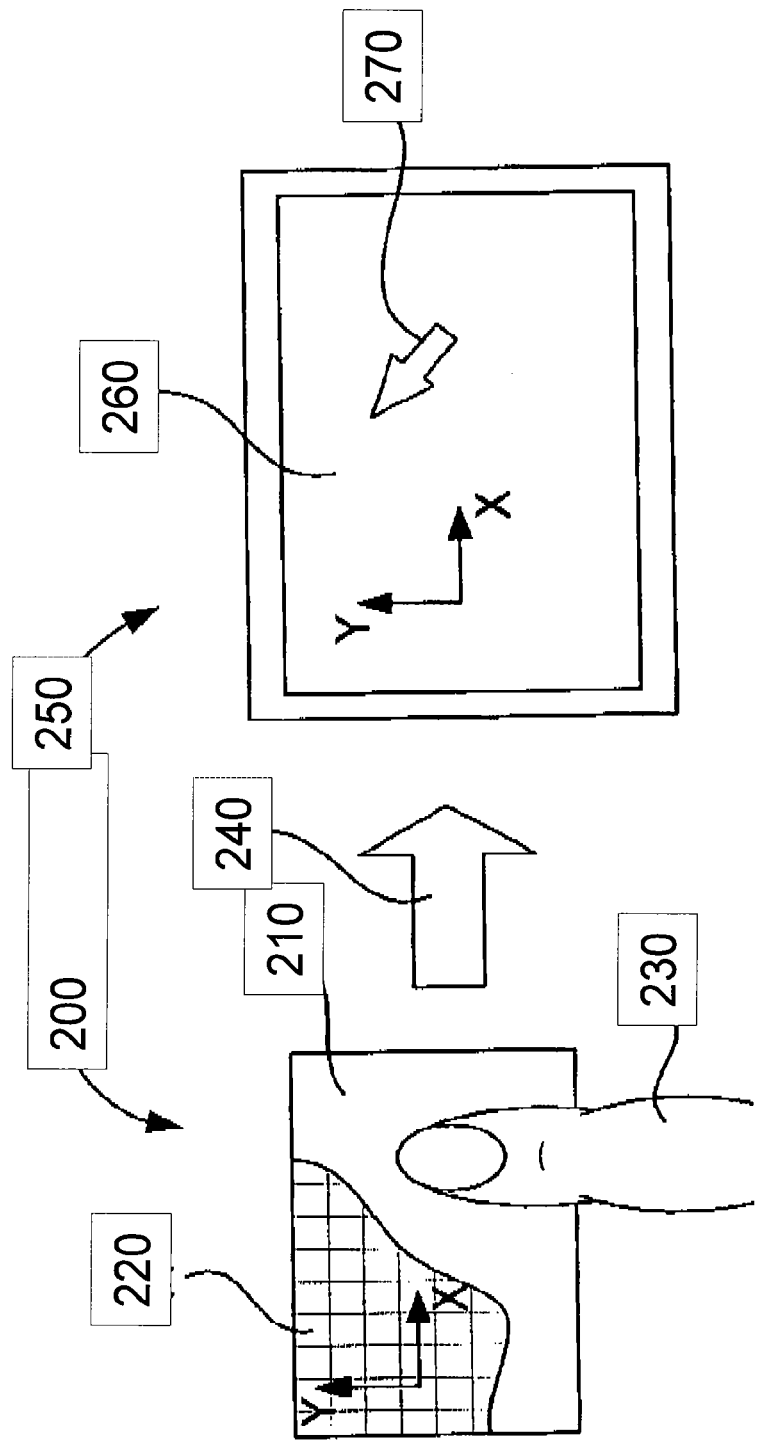
Figure 13:
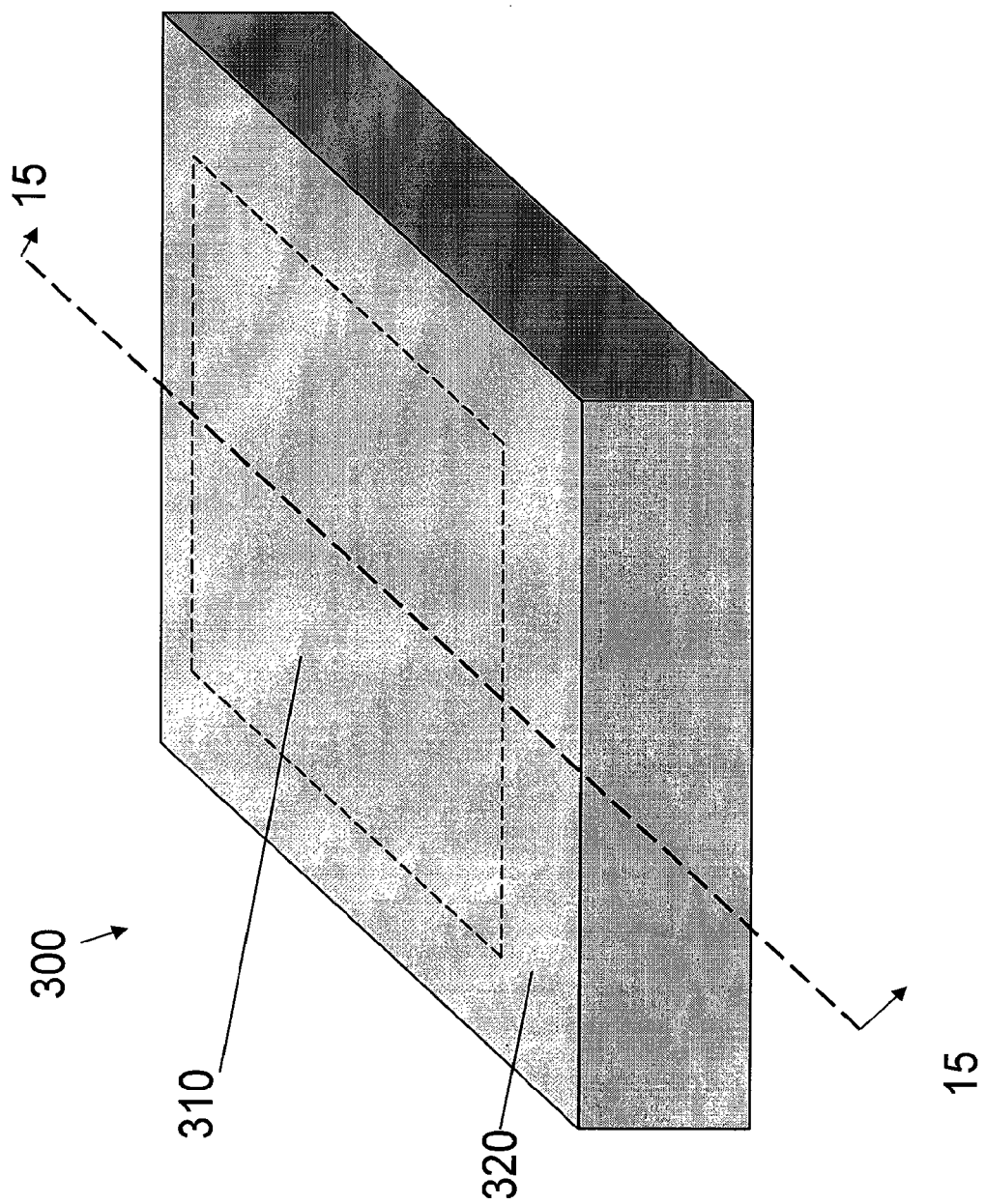
Figure 14:
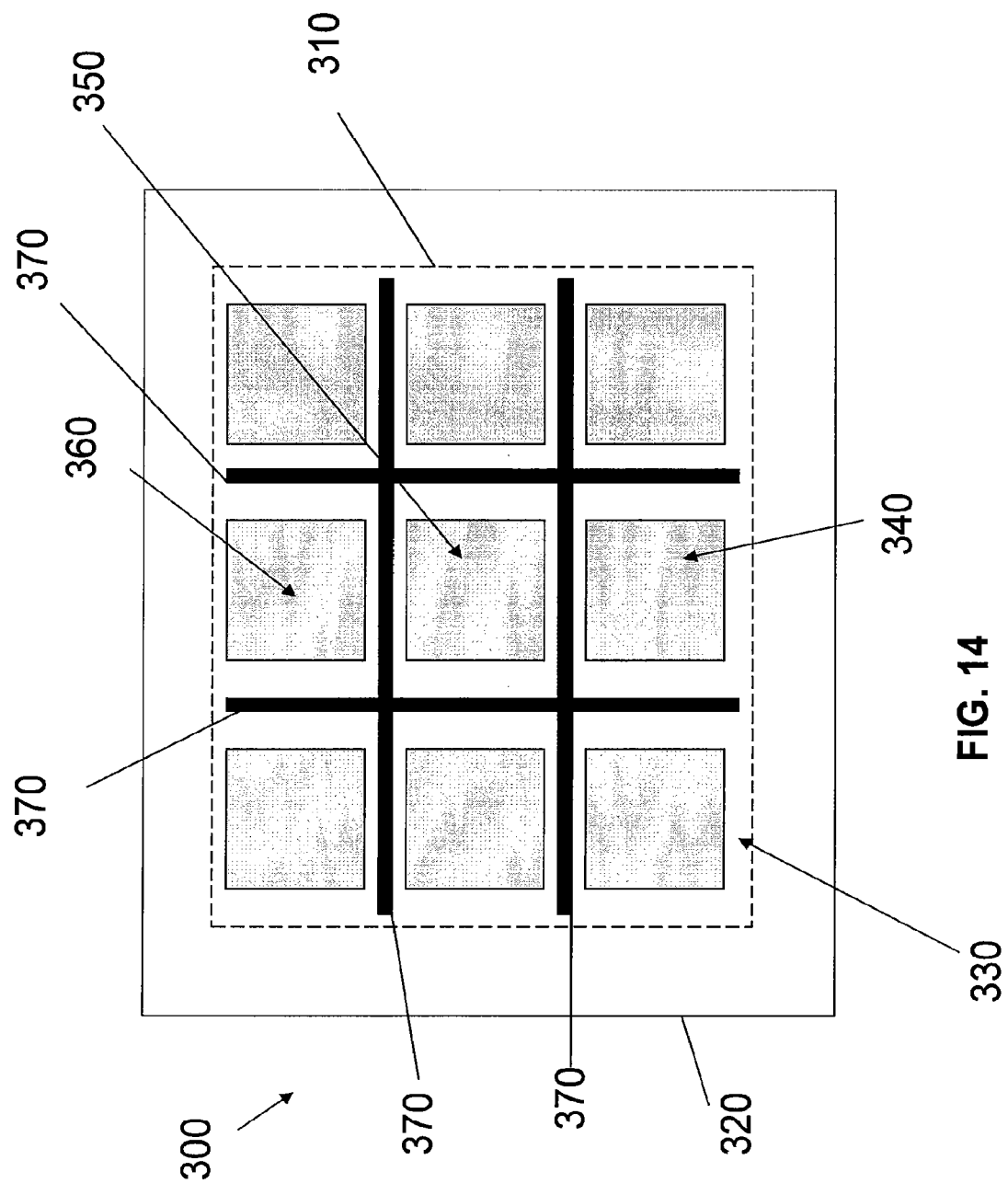
Figure 15:
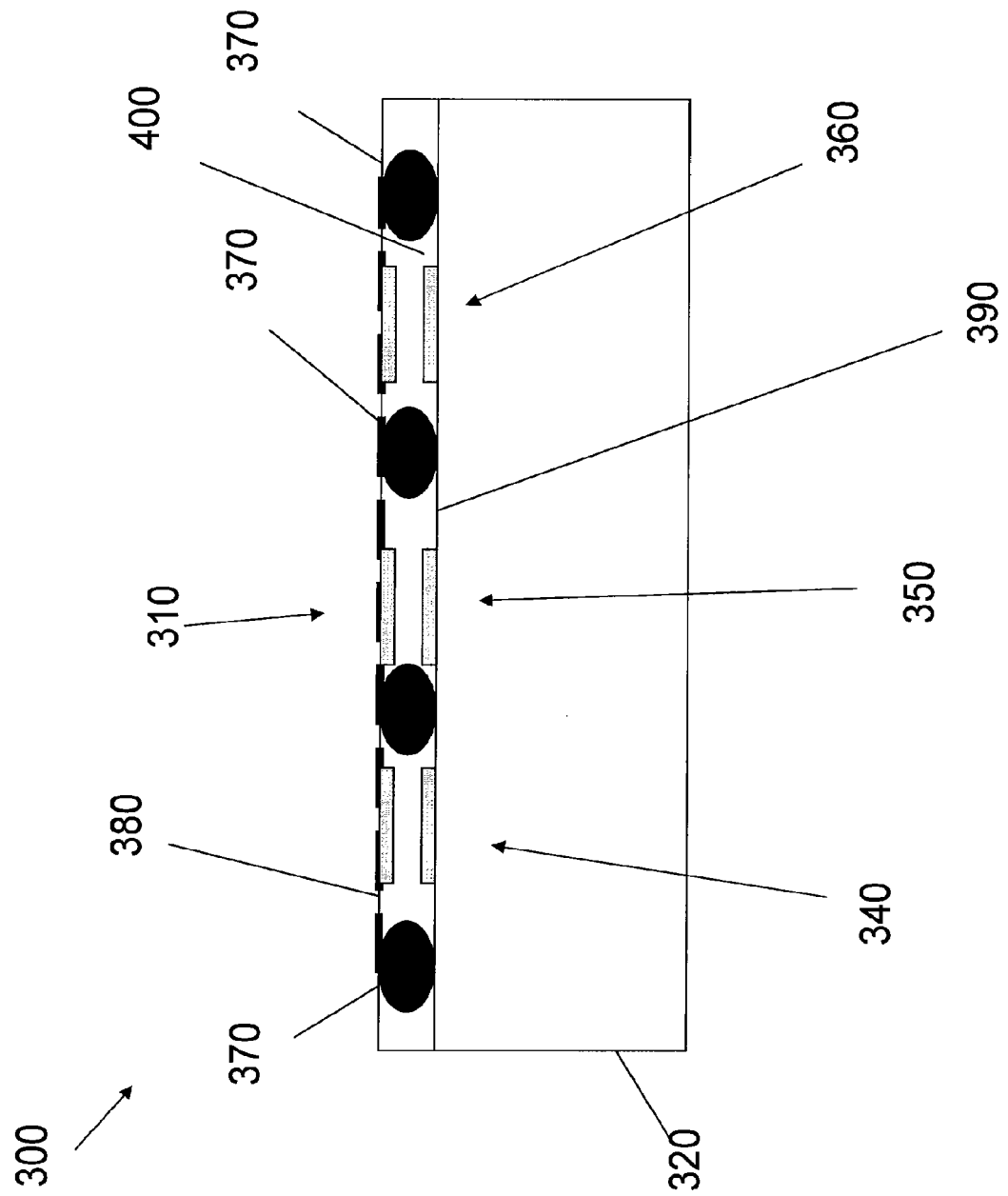
Figure 16:
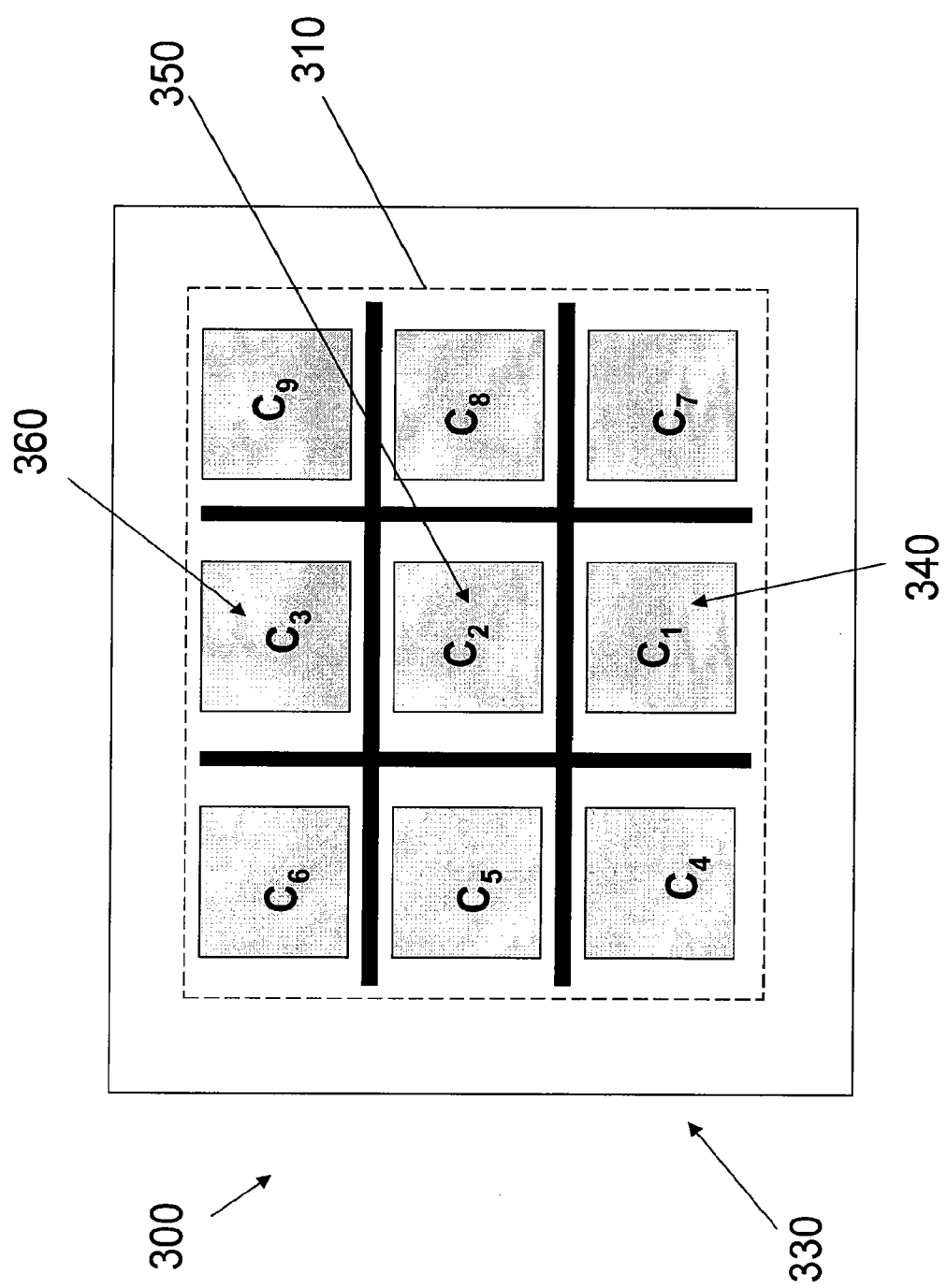
Figure 17:
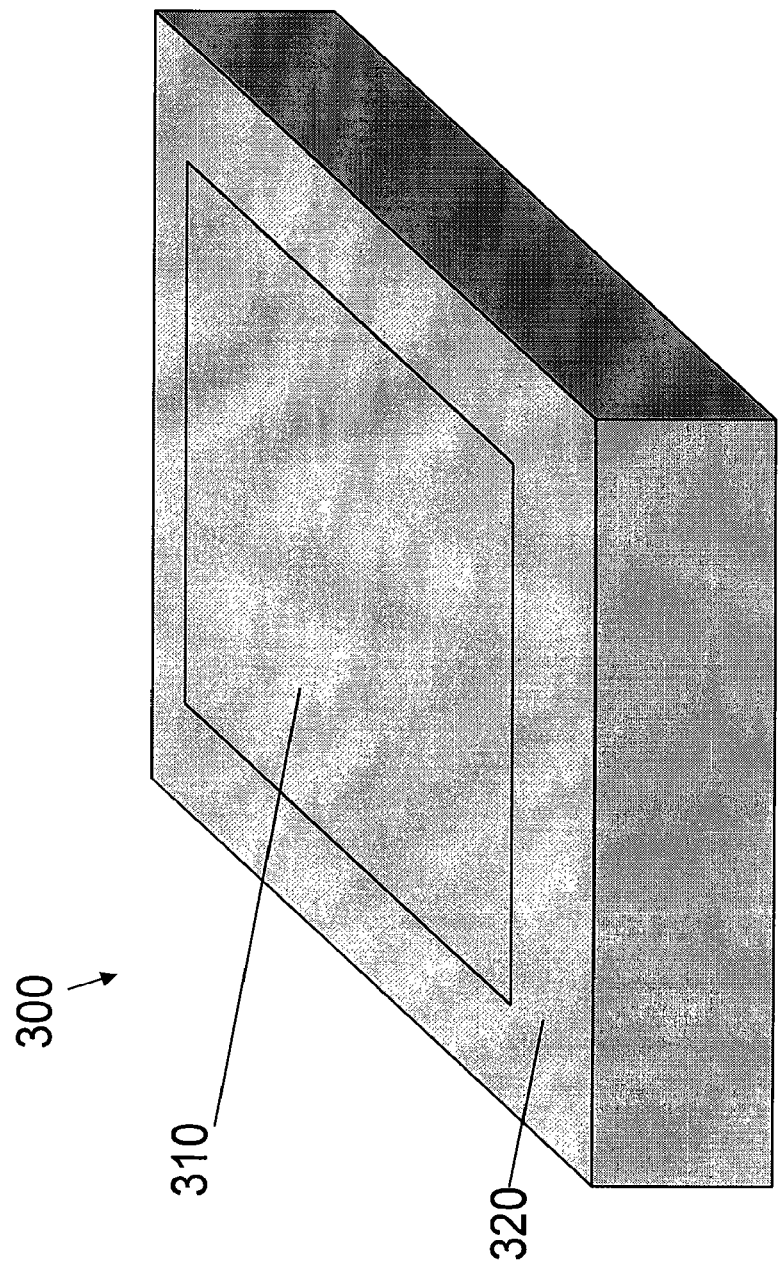
Figure 20:
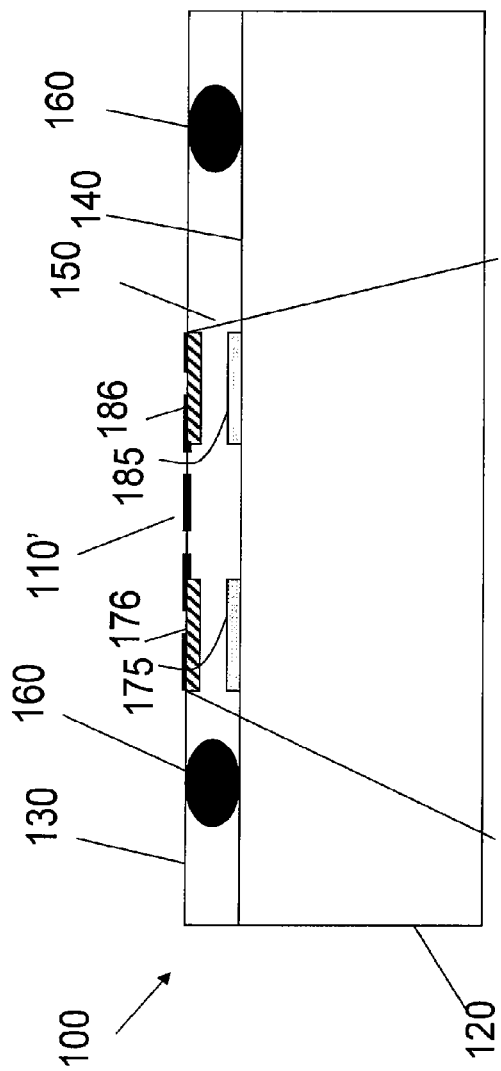
Figure 21:
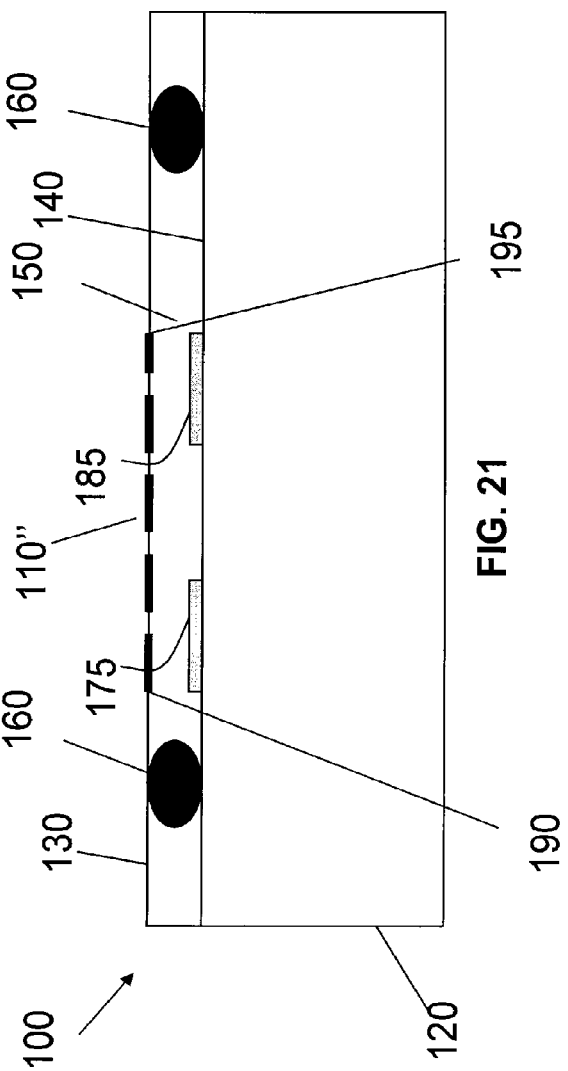
Figure 24:
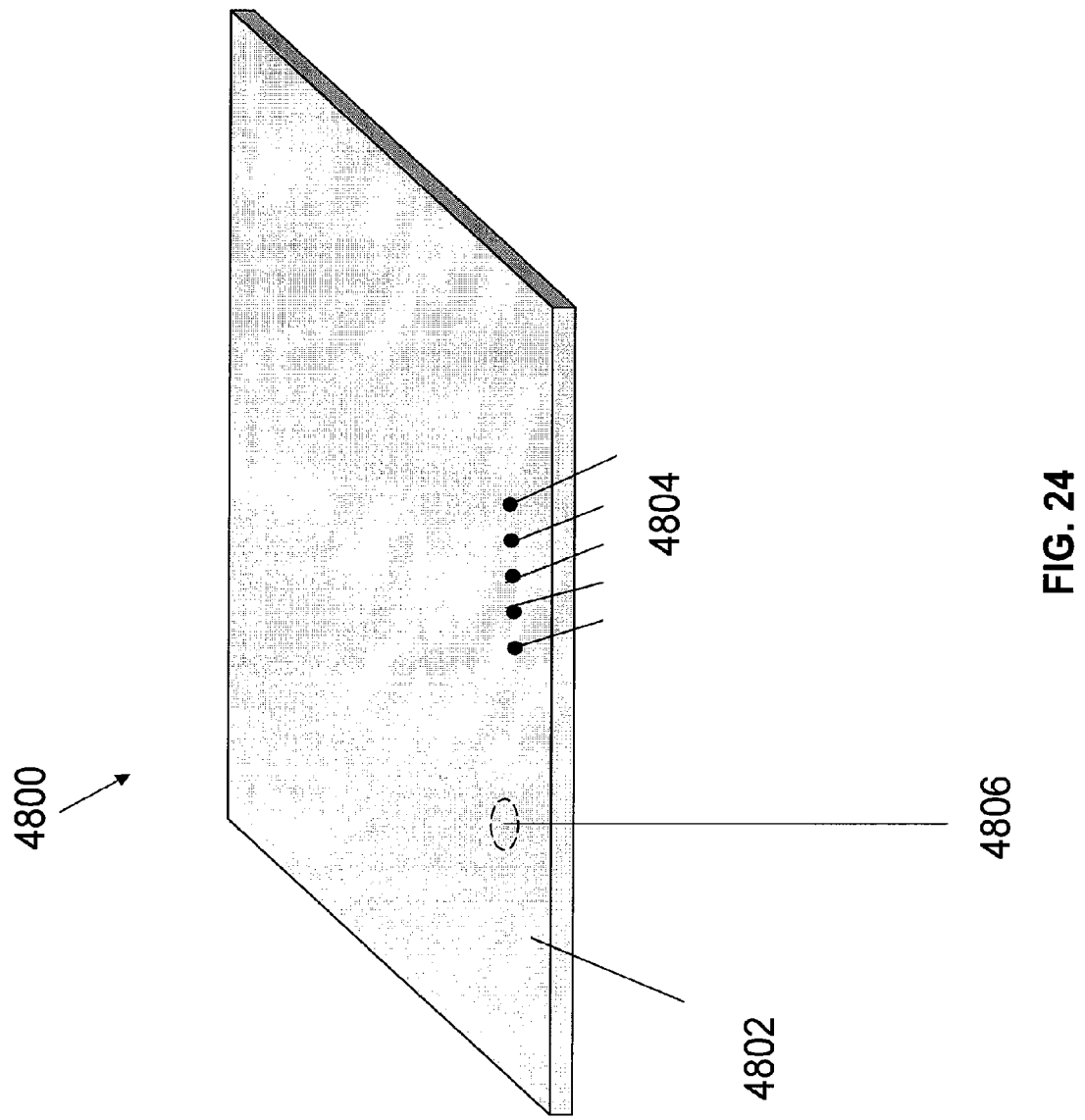
Figure 25:
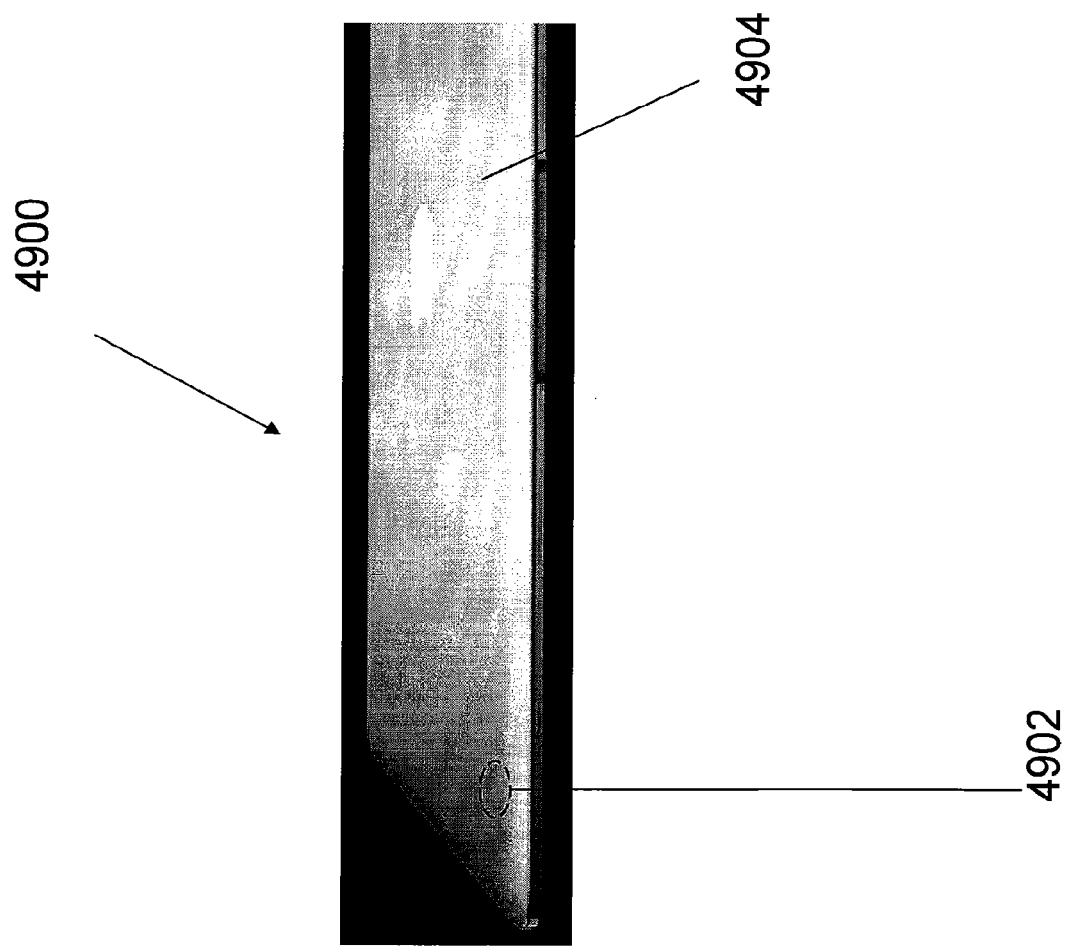
Figure 26:
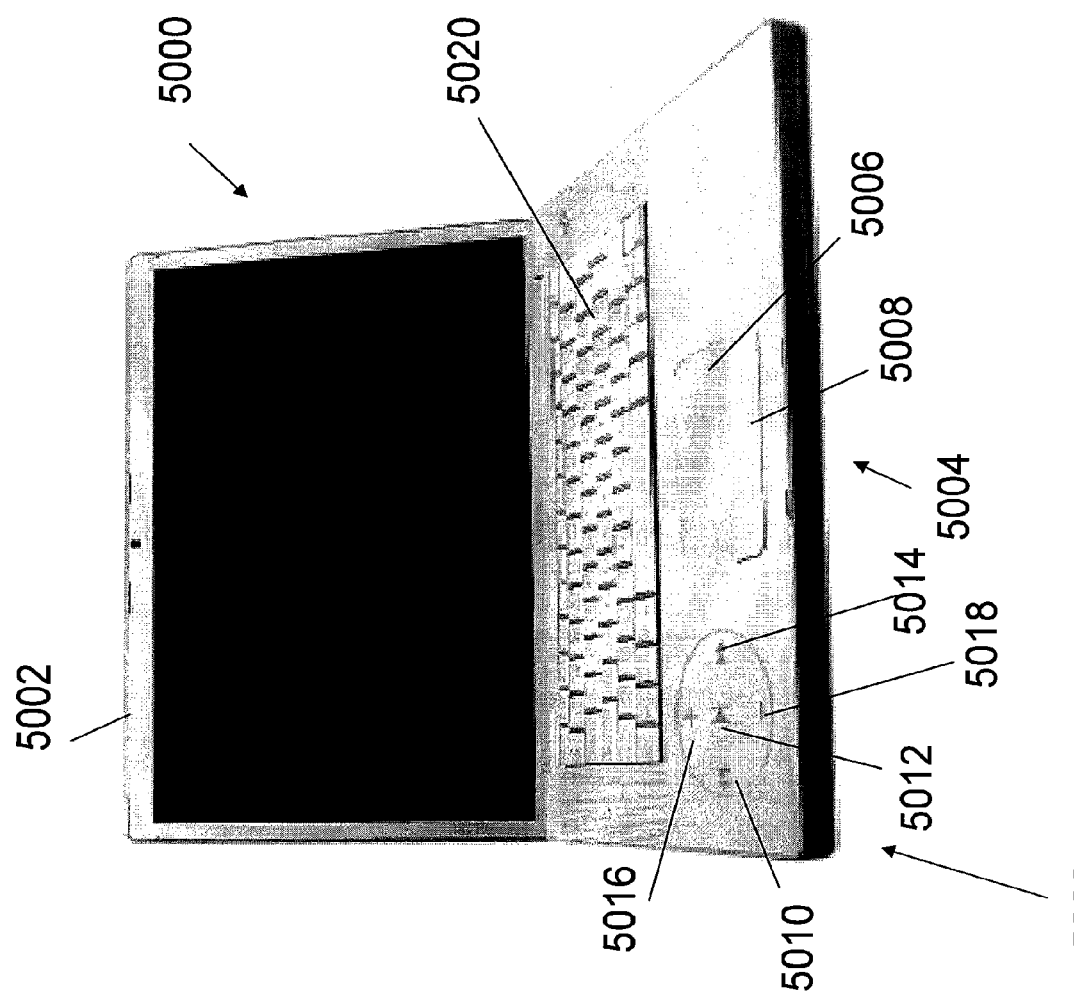

FIG. 4. is a cross sectional view of an alternate embodiment of the electronic device of FIG. 1;

FIG. 5A is a perspective view of an embodiment of the electronic device of FIG. 4;

FIG. 5B is a magnified view of a portion of the electronic device of FIG. 5A;

FIG. 6 is a perspective view of another electronic device according to the present invention;

FIG. 7 is a cross sectional view of the electronic device of FIG. 6, taken along line 7-7 in FIG. 6 in a first position;

FIG. 8 is another cross sectional view of the electronic device of FIG. 6, taken along line 7-7 in FIG. 6 in a second position;

FIG. 9 is another cross sectional view of the electronic device of FIG. 6, taken along line 7-7 in FIG. 6 in a third position;

FIG. 10. is a cross sectional view of an alternate embodiment of the electronic device of FIG. 6;

FIG. 11 is a perspective view of an alternate embodiment of the electronic device of FIG. 6;

FIG. 12 is a schematic of a conventional track pad;

FIG. 13 is a perspective view of an electronic device according to the present invention;

FIG. 14 is a schematic plan view of internal portions of the electronic device of FIG. 13;

FIG. 15 is a cross sectional view of the electronic device of FIG. 13, taken along line 15-15 in FIG. 13;

FIG. 16 is a schematic plan view of internal portions of the electronic device of FIG. 13;

FIG. 17 is a perspective view of an alternate embodiment of the electronic device of FIG. 13;

FIG. 18 is a cross sectional view of another electronic device according to the present invention;

FIG. 19 is a cross sectional view of another electronic device according to the present invention;

FIG. 20 is a cross sectional view of another electronic device according to the present invention;

FIG. 21 is a cross sectional view of another electronic device according to the present invention;

FIG. 22 is a cross sectional view of another electronic device according to the present invention;

FIG. 23 is a cross sectional view of another electronic device according to the present invention;

FIG. 24 is perspective view of a laptop computer according to the present invention;

FIG. 25 is a front view of a laptop computer according to the present invention; and FIG. 26 is a front view of a laptop computer according to the present invention.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Likewise, the drawings showing embodiments of the system are semi-diagrammatic and not to scale and, particularly, some of the dimensions are for the clarity of presentation and are shown greatly exaggerated in the drawing figures.

Similarly, although the views in the drawings for ease of description generally show similar orientations, this depiction in the figures. is arbitrary for the most part. Generally, the invention can be operated in any orientation. In addition, where multiple embodiments are disclosed and described having some features in common, for clarity and ease of illustration, description, and comprehension thereof, similar and like features one to another will ordinarily be described with like reference numerals.

Referring now to FIG. 1, a generic electronic device 10 is shown. Device 10 could be, for example, a laptop computer, a media device, a remote control, a game player, or any other device that requires a button or switch. Device 10 features an invisible button or switch 20, whose location is shown in phantom. Button 20 is used to control some function associated with electronic device 10. Device 10 has a metal frame 30, which may be, for example, aluminum. Button 20 is invisible because it is made from and integral with the same metal as frame 30. Button 20 is flush with and does not bulge out or otherwise protrude into or out of frame 30. Therefore, it is not visible from the exterior of device 10. Frame 30 may have markings (e.g., paint, texture) to indicate the location of button 20.

Figure 2:
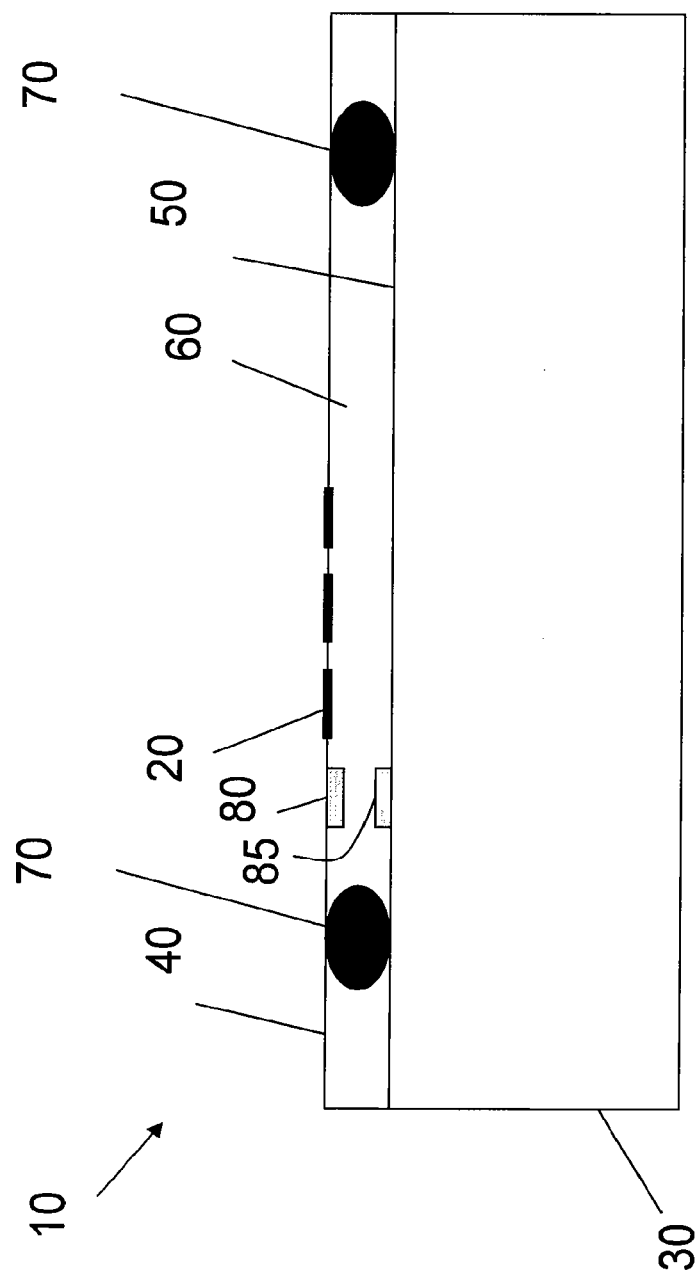
FIG. 2 is a cross sectional view of the electronic device of FIG. 1, taken along line 2-2 in FIG. 1 in a first position.

FIG. 2 shows a side cross sectional view of device 10, taken along line 2-2 shown in FIG. 1. Metal frame 30 has a face 40. Inside of device 10, there is an interior wall 50 below face 40. In between face 40 and wall 50 is a dielectric medium 60, such as air. In another implementation, dielectric medium 60 can be foam or rubber. In these implementations, supports 70 could be unnecessary and therefore removed. Supports 70 are disposed between face 40 and interior wall 50. Dielectric medium 60 can be a dielectric gel (instead of air).

In the vicinity of invisible button 20, a capacitor plate 80 is disposed on an inner surface of face 40, and another capacitor plate 85 is disposed on a top surface of interior wall 50 opposite plate 80. Capacitor plates 80 and 85 may be attached to, for example, printed circuit boards (PCBs) which are disposed on face 40 and/or wall 50. In one embodiment, wall 50 is a PCB. In another embodiment, capacitor plates 80 and/or 85 can comprise conductive paint printed on face 40 and wall 50. As used herein, a "capacitor plate" could be any conducting material which is separated from another conducting material. In the illustrated embodiment, capacitor plates 80 and 85 are shown as discrete objects attached to face 40 and wall 50. In another embodiment (not shown) the face 40 and wall 50 themselves may function as capacitor plates.

There is a fixed separation between capacitor plates 80 and 85 when button 20 is not being depressed. This is important because the capacitance, C, between separated plates 80 and 85 is a function of their separation. When button 20 is not depressed, the zero-pressure capacitance, $C_0$, is related to the initial separation of plates 80 and 85. Departures from the initial separation will cause a change in capacitance, $\Delta C \equiv C - C_0$, which can be detected and processed by device 10. In practice, $C_0$ may not be strictly a function of separation. Other factors, such as changes in temperature, humidity, age of components, and the like can cause minor fluctuations in $C_0$. Therefore, a new estimate or baseline for the zero-pressure $C_0$ may be updated. In one embodiment, this update can be done each time device 10 starts up. In another embodiment, this update can be done during certain time intervals (for example every few minutes). Updating $C_0$ helps to ensure higher sensitivity and lower occurrences of false triggers.

Figure 3:
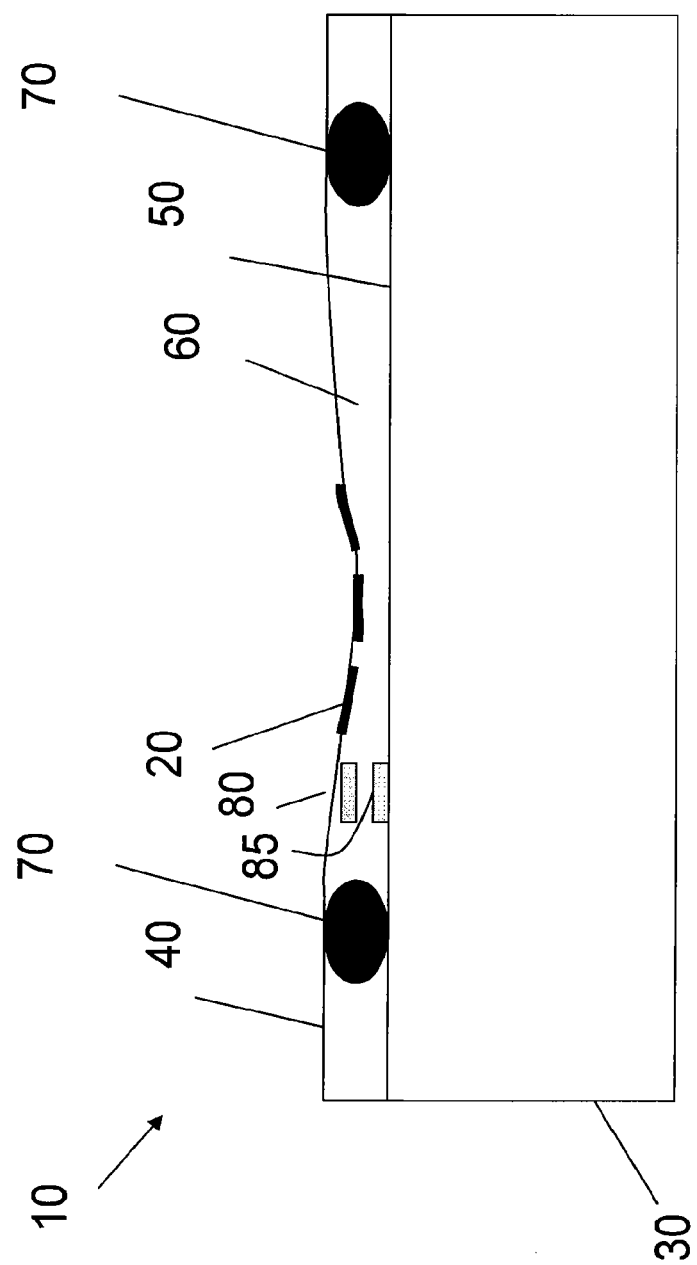
FIG. 3 is another cross sectional view of the electronic device of FIG. 1, taken along line 2-2 in FIG. 1 in a second position.

When a user presses down on invisible button 20, face 40 deflects between supports 70, as shown in FIG. 3. This causes the distance between capacitor plates 80 and 85 to decrease, creating an associated change in capacitance, $\Delta C$. A capacitive sensor (not shown) associated with device 10 detects this change, and if the change is above some preset threshold, T, a button function is activated. In other words if $\Delta C \geq T$ the button function is activated. For example, when the user presses down on button 20, device 10 may turn on or off. Since both capacitor plates 80 and 85 are internal to device 10, it is not necessary to push button 20 with a conducting material, e.g., a finger or stylus, as is the case with traditional capacitive sensing technology (e.g, glass touch screens). In contrast to traditional capacitive sensing surfaces, a user could successfully activate button 20 wearing a non-conductive glove, for example.

The on/off, or "binary," mode of operation described above is the simplest mode. In other embodiments, the change in capacitance $\Delta C$ could be correlated to a "continuous" output functionality. In this implementation, a larger $\Delta C$ could be associated with a command to full intensity. A very small $\Delta C$ could be associated with a command to low intensity. For example, how far the user presses down could correlate to how bright to make a light, for example, how loud to play music, or how fast to go forward or backward in a movie. In this continuous functionality mode, the correlation between capacitor plate distance and change in capacitance $\Delta C$ must be found through routine experiment, theory, calculation or combinations thereof. In other embodiments, button 20 could have three levels of functionality. This is a compromise between the binary and continuous modes. For example, before the user presses down, device 10 is "off," when the user presses down a certain amount, device 10 operates at 50%, and when the user presses down a certain amount more, device 10 operates at 100%. This could mean that device 10 could be used to turn a light from off, to 50% intensity, to 100% intensity depending on user input. Of course, many variations of this multi-level functionality mode are possible (e.g., 4 or more levels).

Supports 70 limit the area where a user can activate button 20. In the illustrated embodiment, if a user presses down to the left of the left support 70, for example, capacitor plates 80 and 85 will not appreciably move towards each other. Therefore, a change in capacitance (if any) will not exceed the threshold required to register a button depression, i.e., $\Delta C < T$. The supports can be closely spaced, thereby making the effective area of button 20 small, or the supports can be widely spaced, thereby making the effective area of button 20 large, as is shown in the illustrated embodiment. The configuration of supports 70 is shown for illustration only and may be widely varied. For example, there could be two supports, as shown in the illustrated embodiment, or there could be more than two supports, or only one support. In one embodiment (not shown), the entire surface 40 can function as button 20 if supports 70 are removed. In this implementation, the outer vertical part of frame 30 functions to keep face 40 and wall 50 separated when button 20 is not being depressed. Therefore, supports 70 are not necessary.

Supports 70 may be etched out of face 40 and/or wall 50 or they may be free standing. In one embodiment, supports 70 are formed by etching the bottom surface of face 40 so that supports 70 extend downwardly. In another embodiment, supports 70 are formed by etching the top surface of interior wall 50 so that supports 70 extend upwardly. In another embodiment, face 40 and wall 50 and supports 70 are formed by etching out parts of a monolithic piece. In another embodiment, free standing supports 70 are affixed to face 40 and wall 50 by techniques known in the art, for example adhesives, welds, fasteners, etc.

In some embodiments, it may not be desirable to have button 20 visible or invisible all of the time. As previously mentioned, although frame 30 may have markings (e.g., paint, texture) to indicate the location of button 20, these markings would be visible all of the time and detract from the aesthetic simplicity of housing 30. To selectively control the visibility of button 20, tiny invisible micro-perforations or holes 90 can be formed in face 40 as shown in FIG. 4. Button 20 can be selectively backlit to highlight its location by, for example, shining light through holes 90. In one embodiment, a light source, for example a light emitting diode (LED) 95 can be placed on wall 50 under the location of button 20. As shown in FIG. 5A, the location of button 20 is visible LED 95 is activated.

In one embodiment, the backlight (e.g., LED 95) can be activated whenever electronic device 10 is "on." In another embodiment, the backlight can be activated as a function of an operating state of device 10, for example, when a CD-ROM is inserted, when a memory stick is inserted, and so on, depending on the nature of electronic device 10. In another embodiment, the backlight can be activated as a function of ambient lighting conditions, for example, in low light (dark) conditions. In this embodiment, a light sensor (not shown) may interface with LED 95. In another embodiment, the backlight can be activated continuously. In another embodiment, the backlight can be activated when a user taps or presses down on button 20. In another embodiment, a motion sensor (not shown) may interface with LED 95 and activate it when motion is detected. In another embodiments heat and/or sound sensors (not shown) can interface with and activate LED 95 when heat and/or sound is detected.

FIG. 5B is a magnified view of button 20 shown in FIG. 5A. A pattern 22 of holes 90 can be disposed on frame 30 to indicate the borders of button 20. This pattern can be formed by, for example, laser cutting through frame 30. The holes 90, although shown greatly exaggerated in the Figure, are actually invisible. That is, each of the holes 90 is smaller than resolvable by an unaided human eye. For example, the limit of resolution for the human eye is about 0.1 mm at a distance from the eye of 1 meter. In children, the resolution might be somewhat finer, for example, 0.04 mm. Thus, depending upon the anticipated viewer and viewing distance, the holes 90 will be selected to be below the limit of resolution, and it will accordingly be understood that the term "invisible hole" refers to this upper limit. Thus, as defined herein, "invisible holes" refers to holes that are smaller than resolvable by an unaided human eye. In one embodiment, the diameter of invisible holes 90 can range from between 20 μm to 80 μm, inclusive. Light shining through holes 90 is visible to the naked eye. This gives the impression that button 20 can be made visible or invisible at will.

In another embodiment, the pattern of holes 22 can be made to resemble the function of button 20, for example, the pattern can resemble a triangle to indicate a "play" function when controlling music selections, or the pattern can resemble a square to indicate a "stop" function. In this way, when the backlighting is activated, a play or stop symbol appears on device 10 at the location of button 20. In another embodiment (not shown), pattern 22 can resemble text or numbers. Micro-perforated invisible holes 90 are explained in greater detail in U.S. patent application Ser. No. 11/551,988 filed Oct. 30, 2006, titled "INVISIBLE, LIGHT-TRANSMISSIVE DISPLAY SYSTEM," and U.S. patent application Ser. No. 11/456,833 filed Jul. 11, 2006 titled "INVISIBLE, LIGHT-TRANSMISSIVE DISPLAY SYSTEM." The Ser. No. 11/551,988 and the Ser. No. 11/456,833 applications are both herein incorporated in their entirety by reference thereto.

As discussed above, button 20 is particularly suited to applications involving binary or on/off operations. Button 20 is also suited to applications involving continuous output functions; but, as discussed, a possibly complicated correlation between button displacement and change in capacitance is necessary for button 20 to be able to control a continuous output function. A simpler way to control a continuous output function involves using multiple pairs of capacitive plates, as will be discussed below.

Referring now to FIG. 6, a generic electronic device 100 is shown. Device 100 features an invisible "slider" or switch 110, whose location is shown in phantom. Slider 110 is used to control some function associated with electronic device 100. Device 100 has a metal frame 120. Slider 110 is invisible because it is integral with and made from the same metal as frame 120. Furthermore, slider 110 is flush with and does not bulge out or otherwise protrude into or out of frame 120, therefore it is not visible from the exterior of device 100. Slider 110 has a first end 190 and a second end 195.

FIG. 7 shows a side cross sectional view of device 100, taken along line 7-7 shown in FIG. 6. Metal frame 120 has a face 130. Inside of device 100, there is an interior wall 140 below face 130. In between surfaces 130 and 140 is a dielectric medium 150, e.g., air. Supports 160 are disposed between outer surface 130 and interior surface 140. Face 130 may have markings (e.g., paint, texture) to indicate the location of slider 110.

A first pair of capacitor plates 170 and 175 and a second pair of capacitor plates 180 and 185 are situated along the left and right sides, respectively, of invisible slider 110. Upper plate 170 is disposed on an inner surface of face 130, and capacitor plate 175 is disposed on a top surface of interior wall 140. Capacitor plates 170 and 175 may be attached to, for example, PCBs which are attached to face 130 and/or wall 140. In one embodiment, wall 140 is a PCB. In another embodiment, capacitor plates 170 and/or 175 can comprise conductive paint printed on face 130 and wall 140. The second pair of capacitor plates 180 and 185 are disposed similar to the first pair 170 and 175. In the illustrated embodiment, capacitor plates 170/175 and 180/185 are shown as discrete objects attached to face 130 and wall 140. In another embodiment (not shown) the face 130 and wall 140 themselves may have conductive areas and non-conductive areas so as to form a pair of opposing capacitor plates. When two or more sensors are used, for example, two or more pairs of capacitor plates, the slider function is enabled.

There is a fixed separation between the opposite capacitor plates of each pair (170/175 and 180/185) when slider 110 is not being depressed. This is important because the capacitance, C, between plates 170/175 and 180/185 is a function of their separation. Departures from the initial separation will cause a change in capacitance, ΔC, which can be detected and processed by device 100. In this embodiment the first pair of capacitive plates 170/175 is characterized by $C_1$ and $\Delta C_1$, while the second pair of capacitive plates 180/185 is characterized by $C_2$ and $\Delta C_2$. As discussed above, the zero-pressure capacitances between plates 170/175 and plates 180/185 may be updated to account for changes due to other factors such as temperature, humidity, age of components, etc.

Referring back to FIGS. 1-3, if a user presses down on binary invisible button 20 far enough to meet a threshold change in capacitance, a button signal is detected. In other words, the exact location of the user's finger is not critical to the operation of button 20 as long as it is over button 20. Now referring back to FIG. 7, with slider 110, the location of the user's finger (or other object) is critical. Slider 110 can be correlated with a continuous output scale from 0% to 100% so that when the user presses down on slider 110 10% of the way between its extreme ends 190 and 195, a function will be commanded at 10% intensity. In one application, slider 110 could be a volume control wherein a user simply and intuitively presses at (or slides to) the desired volume level. In one application, end 190 is correlated to the 100% intensity level, while end 195 is correlated to the 0% intensity level. This concept is explained in greater detail below.

When a user presses down on invisible slider 110, the metal outer face 130 deflects between supports 160, as shown in FIG. 8. This causes the distance between capacitor plates 170 and 175 to decrease, with an associated change in capacitance $\Delta C_1$ between them. A capacitive sensor (not shown) associated with device 100 detects this change. In the illustrated embodiment, the user has pressed down on slider 110 near end 190 (i.e., the high intensity end). Note that the separation between the first pair of capacitor plates 170/175 has markedly decreased, while the separation between the second pair of capacitor plates 180/185 has barely changed. The capacitive sensor (not shown) therefore detects a smaller change in capacitance $\Delta C_2$ associated with the second pair. The capacitive sensor converts these respective changes in capacitance to electrical signals $S_1$ and $S_2$.

At this point, electronics (not shown) associated with device 100 can compare the signal $S_1$ generated by the first pair of capacitor plates 170/175 with the signal $S_2$ generated by the second pair of capacitor plates 180/185 in order adjust a continuous output function in accordance with the exact position along slider 110 of the user's finger. One way to do this is by taking a ratio of the two signals. In the illustrated embodiment, the separation between the first pair of capacitor plates 170/175 is very small and so $S_1$ will be a large signal. The second pair of capacitive plates 180/185 are relatively unperturbed from their initial (neutral) positions. Therefore, the signal they generate, $S_2$, will be very small. Consequently, the ratio $S_1:S_2$ will be enormous. A large signal ratio can be correlated to having the user's finger near end 190. When the user is pressing down near end 190, he intends to command a high intensity, perhaps near 100%. Therefore, device 100 will operate near 100% intensity. This could mean that music is played loudly, a light comes on brightly, or any other continuous output function is commanded to near 100% intensity.

In another implementation, slider 110 can be used to control a scrolling function, for example to scroll down (or left/right) a page of text or to scroll through music selections. When the user presses slider 110 near end 190, the scroll will go, for example, forward at maximum speed. When the user presses slider 110 near end 195, the scroll will go in reverse at maximum speed. Intermediate positions on slider 110 will command a scroll at a lesser speed in the commanded direction (i.e., forward or reverse). These functions are given by way of example, slider 110 can be used to control any continuous output function associated with device 100.

If the user presses down near the midpoint of slider 110 (i.e., half way between ends 190 and 195), as is shown in FIG. 9, he intends to command device 100 to operate at 50% intensity. Because the first pair of capacitor plates 170/175 and the second pair of capacitor plates 180/185 are moved closer to each other by approximately equal amounts, they will generate approximately equal changes in capacitance compared with their neutral positions, i.e. $\Delta C1 \approx \Delta C2$. This means that the ratio $S_1:S_2$ will be approximately 1:1. A signal ratio of 1:1 is correlated with a commanded 50% intensity level.

The 100% and 50% intensity situations are shown in FIGS. 8 and 9. A user can press slider 110 anywhere between ends 190 and 195 in order to command any intensity from 100% to 0%. Furthermore, the ratio $S_1:S_2$ can be continuously computed such that the user can continuously slide his finger along slider 110 to continuously change the commanded intensity level to any desired level, provided sufficient pressure is applied to deflect upper surface 130.

Supports 160 limit the area where a user can activate slider 110. In the illustrated embodiment, if a user presses down to the left of the left support 160, for example, neither pair of capacitor plates 170/175 or 180/185 will appreciably move towards each other. Therefore, a change in capacitance (if any) will not exceed the threshold required to register a slider depression. The supports can be closely spaced, thereby making the effective area of slider 110 small, or the supports can be widely spaced, thereby making the effective area of slider 110 large, as is shown in the illustrated embodiment. The configuration of supports 160 is shown for illustration only and may be widely varied. For example, there could be two supports, as shown in the illustrated embodiment, or there could be more than two supports, or only one support. In one embodiment (not shown), the entire face 130 can function as slider 110 if supports 160 are removed. In this implementation, the outer vertical part of frame 120 functions to keep face 130 and wall 140 separated when slider 110 is not being depressed. Therefore, supports 160 are not necessary.

Supports 160 may be etched out of surfaces 130 and/or 140 or they may be free standing. In one embodiment, supports 160 are formed by etching the bottom surface of face 130 so that supports 160 extend downwardly. In another embodiment, supports 160 are formed by etching the top surface of interior wall 140 so that supports 160 extend upwardly. In another embodiment, face 130 and wall 140 and supports 160 are formed by etching out parts of a monolithic piece. In another embodiment, free standing supports 160 are affixed to face 130 and wall 140 by techniques known in the art, for example adhesives, welds, fasteners, etc.

In some embodiments, it may not be desirable to have slider 110 visible or invisible all the time. As previously mentioned, although face 130 may have markings (e.g., paint, texture) to indicate the location of slider 110, these markings would be visible all of the time and detract from the aesthetic simplicity of face 130. To selectively control the visibility of slider 110, tiny micro-perforations or holes 280 can be formed in face 130 as shown in FIG. 10. Slider 110 can be selectively backlit to highlight its location by, for example, shining light through holes 280. In one embodiment, a light source, for example a light emitting diode (LED) 210 can be placed on surface 140 under the location of slider 110. As shown in FIG. 11, the location of slider 110 is visible when LED 210 is activated.

Invisible slider 110 is depicted as being linear in FIGS. 6-11 for ease of explanation only; however, this is not a limitation. Other shapes are also possible. For example, in one embodiment an invisible slider can be formed in the shape of a scroll wheel (not shown). Invisible slider 110 is depicted as having two pairs of capacitor plates in the figures. This is the minimum requirement for the slider functionality, because as described above, the signals from at least two separate capacitive sources can be compared to determine the location of an object placed on the slider. However, more capacitor plates can be used to give the slider more positional resolution. If for example, three pairs of capacitor plates are used, the signals from each of them can be used to determine the position of an object placed on the slider, and so on.

In one embodiment, the backlight (e.g., LED 210) can be activated whenever electronic device 100 is "on." In another embodiment, the backlight can be activated as a function of an operating state of device 100, for example, when a CD-ROM is inserted, when a memory stick is inserted, and so on, depending on the nature of electronic device 100. In another embodiment, the backlight can be activated as a function of ambient lighting conditions, for example, in low light (dark) conditions. In this embodiment, a light sensor (not shown) may interface with LED 290. In another embodiment, the backlight can be activated continuously. In another embodiment, the backlight can be activated when a user taps or presses down on slider 110. In another embodiment, a motion sensor (not shown) may interface with LED 290 and activate it when motion is detected. In another embodiments heat and/or sound sensors (not shown) can interface with and activate LED 290 when heat and/or sound is detected.

A pattern (similar to pattern 22 shown in FIG. 5B) of holes 280 can be disposed on face 130 to indicate the borders of slider 110. This pattern can be formed by, for example, laser cutting through face 130. Holes 280 are formed such that they are too small for the unaided human eye to detect; therefore, they appear to be invisible. However, light shining through holes 280 is visible to the naked eye. This gives the impression that slider 110 can be made visible or invisible at will.

Conventional touch sensitive track pads require a dielectric outer track surface; consequently they, unlike the housing of most electronic devices, are not made from metal resulting in a clearly visible transition between housing and track pad. Referring to FIG. 12, a conventional touch-sensitive track pad 200 is shown. A track pad is generally a small (often rectangular) area that includes a protective/cosmetic shield 210 and a plurality of electrodes 220 disposed underneath protective shield 210. Electrodes 220 may be located on a circuit board, for example a printed circuit board (PCB). For ease of discussion, a portion of protective shield 210 has been removed to show electrodes 220. Each of the electrodes 220 represents a different x, y position. In one configuration, an object, such as a finger 230 (or alternately a stylus, not shown) approaches the electrode grid 220, a tiny capacitance forms between finger 230 and the electrodes 220 proximate the finger 230. The circuit board/sensing electronics (not shown) measures capacitance and produces an x, y input signal 240 corresponding to the active electrodes 220 which is sent to a host device 250 (e.g., a computing device) having a display screen 260. The x, y input signal 240 is used to control the movement of a cursor 270 on display screen 260. As shown, the input pointer moves in a similar x, y direction as the detected x, y finger motion. Besides moving a cursor, input signal 240 can be used for a variety of functions, for example, making a selection, providing instructions, etc.

Referring now to FIG. 13, a generic electronic device 300 is shown which applies the present invention to a track pad. Device 300 features an invisible track pad 310, whose location is shown in phantom. Track pad 310 is used to control some function associated with electronic device 300. Device 300 has a metal frame 320. Track pad 310 is invisible because it is integral with and made from the same metal as frame 320. Furthermore, track pad 310 is flush with and does not bulge out or otherwise protrude into or out of frame 320. Therefore, it is not visible from the exterior of device 300. Frame 320 may have markings (e.g., paint, texture) to indicate the location of track pad 310.

Track pad 310 is similar to slider 110, but track pad 310 has a two-dimensional matrix of capacitor plate pairs, while slider 110 has a one-dimensional line of capacitor plate pairs (see FIG. 7). This two-dimensional matrix 330 of capacitor plate pairs is seen from above in FIG. 14. For clarity of explanation, track pad 310 is shown as having a three by three matrix of capacitor plates; however, the matrix could be as small as two by two or could have many more pairs of capacitor plates. Also for clarity of explanation, only capacitor plate pairs 340, 350, and 360 are labeled. Supports 370 separate the pairs of capacitor plates, in a similar manner as supports 70 (FIG. 3) and supports 160 (FIG. 8) do with invisible button 20 and invisible slider 110.

FIG. 15 is a cross section of device 300 taken along line 15-15 of FIG. 13. Metal frame 320 has a face 380. Inside of device 300, there is an interior wall 390 below face 380. In between face 380 and wall 390 there is a dielectric medium 400, e.g., air. Each of the capacitor plate pairs 340, 350, and 360 are made up of opposing capacitor plates, similar to other embodiments of the present invention. Upper capacitor plates of each pair are disposed on an inner surface of face 380, and lower capacitor plates of each pair are disposed on a surface of interior wall 390. These capacitor plates may be attached to, for example, PCBs which are attached to face 380 and/or wall 390. In one embodiment, wall 390 is a PCB. In another embodiment, capacitor plates pairs 340, 350, and 360 can comprise conductive paint printed on face 380 and wall 390. As shown in FIG. 15, the capacitor plates of pairs 340, 350, and 360 are shown as discrete objects attached to face 380 and wall 390. In another embodiment (not shown) the face 380 and wall 390 themselves may have conductive areas and non-conductive areas so as to form an array of pairs of opposing capacitor plates.

There is a fixed separation between the opposite capacitor plates of each pair when track pad 310 is not being depressed. This is important because the capacitance, C, between two plates is a function of their separation. Departures from the initial separation will cause a change in capacitance, $\Delta C$, which can be detected and processed by device 300. In this embodiment the first pair of capacitive plates 340 are characterized by $C_1$ and $\Delta C_1$, the second pair of capacitive plates 350 are characterized by $C_2$ and $\Delta C_2$, and the third pair of capacitive plates 360 are characterized by $C_3$ and $\Delta C_3$. In the case of a three by three matrix 330 there will be nine capacitances $C_1$, $C_2$, $C_3$, $C_4$, $C_5$, $C_6$, $C_7$, $C_8$, $C_9$ involved as shown in FIG. 16. As discussed above, the zero-pressure capacitances between pairs of capacitive plates in track pad 310 (e.g., pairs 340, 350, and 360) may be updated to account for changes due to other factors such as temperature, humidity, age of components, etc.

Invisible track pad 310 operates in much the same way that invisible slider 110 does, except now a matrix of nine capacitances (for a three by three matrix shown in FIGS. 14-16) and nine changes in capacitance is generated and processed when a user presses down on the surface of track pad 310. If a user presses down right on top of capacitor plate pair 350, a larger change in capacitance $\Delta C_2$ will result. Changes in the other eight capacitances (see FIG. 16), will be relatively smaller; this allows device 300 to infer the location of the user's finger on track pad 310 as being generally in the middle of the pad. As another example, if the user presses down on the bottom right hand corner of track pad 310, $\Delta C_7$ will be large, $\Delta C_1$, $\Delta C2$, and $\Delta C_8$ associated with the nearest neighbor capacitor plate pairs may be moderate, while the other five changes in capacitances will be relatively low (or zero). This allows device 300 to infer that the finger is generally on the bottom right side of track pad 310. And so on. In this way, track pad 310 can command a tracking function. Using even more pairs of capacitor plates, for example a ten by twelve matrix, gives device 300 greater positional resolution but the overall concept remains the same.

As with conventional track pads, invisible track pad 310 can also compute the speed of an object scrolling over its surface, and it can also employ multi-touch technology. Multi-touch consists of a touch surface (track pad, screen, table, wall, etc.), as well as software that recognizes multiple simultaneous touch points, as opposed to the standard touch-screen (e.g., computer touchpad, ATM), which recognizes only one touch point.

In some embodiments, it may not be desirable to have track pad 310 visible or invisible all the time. As previously mentioned, although frame 320 may have markings (e.g., paint, texture) to indicate the location of track pad 310, these markings would be visible all of the time and detract from the aesthetic simplicity of frame 320. To selectively control the visibility of track pad 310, tiny micro-perforations or holes (not shown) can be formed in frame 320 in the area of track pad 310. Track pad 310 can be selectively backlit to highlight its location by, for example, shining light through the invisible holes. In one embodiment, a light source, for example a light emitting diode (LED) can be placed on surface 390 under the location of track pad 310. As shown in FIG. 17, the location of track pad 310 is visible when the backlight (LED) is activated.

In one embodiment, the backlight (e.g., LED) can be activated whenever device 300 is "on." In another embodiment, the backlight can be activated as a function of an operating state of device 300, for example, when a CD-ROM is inserted, when a memory stick is inserted, and so on, depending on the nature of electronic device 300. In another embodiment, the backlight can be activated as a function of ambient lighting conditions, for example, in low light (dark) conditions. In this embodiment, a light sensor (not shown) may interface with the backlight (LED). In another embodiment, the backlight can be activated continuously. In another embodiment, the backlight can be activated when a user taps or presses down on track pad 310. In another embodiment, a motion sensor (not shown) may interface with the backlight and activate it when motion is detected. In another embodiments heat and/or sound sensors (not shown) can interface with and activate the backlight when heat and/or sound is detected.

A pattern (similar to pattern 22 shown in FIG. 5B) of holes can be disposed on frame 320 to indicate the borders of track pad 310. This pattern can be formed by, for example, laser cutting through frame 320. These holes may be formed such that they are too small for the unaided human eye to detect; therefore, they appear to be invisible. However, light shining through these holes is visible to the naked eye. This gives the impression that track pad 310 can be made visible or invisible at will.

The measurable changes in capacitance caused by changing the separation between two capacitor plates, for example plates 80 and 85 (FIGS. 2-4), capacitor plate pairs 170/175 and 180/185 (FIGS. 7-10), and capacitor plate pairs 340, 350, and 360 (FIGS. 14-16) is known as "mutual capacitance." Mutual capacitance is but one general method for measuring capacitance. Another general method is to measure the capacitance between a single capacitor plate and a ground reference. This is known as "capacitance-to-ground." This can effectively cut in half the number of capacitor plates necessary in the present invention, as long as there is a ground reference associated with the remaining capacitor plate(s). Each of these methods involve changing a separation between a capacitor plate and some other "capacitive reference." In the mutual capacitance method, the capacitive reference is a second capacitor plate; in the capacitance-to-ground method, the capacitive reference is a ground reference. As used herein, a "capacitive reference" is either a capacitor plate or a ground reference.

As used herein, the term "ground" does not imply an actual connection to the Earth. Rather, a ground is commonly idealized in the electrical arts as an infinite source or sink for charge, which can absorb an unlimited amount of current without changing its potential. Of course, this is only an idealization, and as such, many surfaces can be considered a "ground" for purposes of the present invention. The term "ground" is to be broadly construed. In one embodiment, the frame of an electronic device can serve as a ground reference. In another embodiment, a ground reference can be disposed on the frame of an electronic device.

The capacitance-to-ground method can be used in place of the mutual capacitance methods discussed above. In one embodiment, invisible button 20 discussed with reference to FIGS. 1-5 can use capacitance-to-ground instead of mutual capacitance. In this embodiment, either of capacitor plates 80 or 85 can be removed and replaced by a ground reference. The capacitance from the remaining capacitor plate will then be measured with respect to ground. As shown in FIG. 18, capacitor plate 80 can be removed and replaced with ground reference 81, which may be a discrete member disposed on face 40 of frame 30. In another embodiment, capacitor plate 80 can be removed and face 40 itself can be a single grounded plane forming the ground reference, as shown in FIG. 19. The invisible buttons of FIGS. 18 and 19 are referred to as 20' and 20", respectively. These invisible button will function as previously described, but they only need a single capacitor plate (instead of the two necessary for mutual capacitance), but they also require a ground reference. As discussed, the face of the frame itself can be the ground reference, or a separate ground reference can be disposed on the frame.

In another embodiment, invisible slider 110 discussed with reference to FIGS. 6-11 can use capacitance-to-ground instead of mutual capacitance. In this embodiment, either of the capacitor plates from each pair (170/175 or 180/185) can be removed and replaced by a ground reference. The capacitance from the remaining capacitor plate will then be measured with respect to ground. As shown in FIG. 20, capacitor plates 170 and 180 can be removed and replaced with ground references 176 and 186, which may be discrete members disposed on face 130 of frame 120. In another embodiment, face 130 itself can be a single grounded plane forming the ground reference, as shown in FIG. 21. The invisible sliders of FIGS. 20 and 21 are referred to as 110' and 110", respectively. These invisible sliders will function as previously described, but they only need two capacitor plates (instead of the four necessary for mutual capacitance), but also require a ground reference(s). As discussed, the face of the frame itself can be the ground reference, or a separate ground reference(s) can be disposed on the frame.

In another embodiment, invisible trackpad 310 discussed with reference to FIGS. 13-17 can use capacitance-to-ground instead of mutual capacitance. In this embodiment, either of the capacitor plates from each pair (e.g., pairs 340, 350, and 360) can be removed and replaced by a ground reference. The capacitance from the remaining capacitor plate from each pair will then be measured with respect to ground. As shown in FIG. 22, the capacitor plates attached to face 380 from each of pairs 340, 350, and 360 can be removed and replaced with ground references 341, 351, and 361, which may be discrete members disposed on face 380 of frame 320. In another embodiment, face 380 itself can be a single grounded plane forming the ground reference, as shown in FIG. 23. The invisible track pads of FIGS. 22 and 23 are referred to as 310' and 310", respectively. These invisible trackpads will function as previously described, but need only nine capacitor plates (instead of the eighteen necessary for mutual capacitance using a three by three array), but they also require a ground reference(s). As discussed, the face of the frame itself can be the ground reference, or a separate ground reference(s) can be disposed on the frame.

In other embodiments (not shown), the present invention can include mutual capacitance (i.e., opposing capacitor plates) and capacitance-to-ground (i.e., a capacitor plate and an opposing ground reference) in the same device.

The invisible input devices described above (button 20, slider 110, and track pad 310) can be used in many different implementations. Several implementations are described below. These implementations are given by way of example only, and not by way of limitation. The person of skill in the art recognizes that the present invention has wide applicability.

The present invention can be used, in one embodiment, as a closed-lid external button for a laptop computer. Referring now to FIG. 24, laptop computer 4800 is shown with its lid 4802 closed. Lid 4802 may be, for example, aluminum. Lid 4802 has an array of invisible status indicators 4804. Status indicators 4804 could, for example, indicate the presence of and level (signal strength) of a wi-fi signal, or they could indicate battery strength. Lid 4802 has an invisible button 4806 (shown in phantom) that functions even when lid 4802 is closed. Button 4806 is based on capacitive sensing. When a user presses lid 4802 at the location of button 4806 lid 4802 deforms in that area and causes a change in capacitance, which in turn causes invisible status indicators 4804 to light up according to the level of wi-fi signal (or battery strength, etc.). Either of invisible button 4806 or invisible status indicators 4804 can employ invisible holes and backlighting to make them selectively visible or invisible to the user.

Referring now to FIG. 25, in another embodiment, laptop computer 4900 has an invisible button 4902 which may function as a closed-lid mode state change button. In one implementation, pressing button 4902 can signal a component of laptop 4900 or an associated external component to "wakeup" from a closed-lid "sleep" mode to a closed-lid "active" mode. For example, pressing button 4902 when laptop computer 4900 is in the closed-lid sleep mode, can wake up an external monitor (not shown), sync an iPod or iPhone (not shown) with laptop computer 4900, or install software to laptop computer 4900 while lid 4904 is closed. In another implementation, invisible button 4902 can shutdown laptop computer 4900 from the closed-lid sleep or closed-lid active modes.

In another embodiment, the present invention can be used to replace traditional track pads and/or traditional track pad buttons with invisible buttons or invisible track pads. Referring now to FIG. 26, laptop computer 5000 is shown with lid 5002 open. Track pad 5004 has a track surface 5006 for scrolling and a button 5008 for clicking. In conventional track pads, track surface 5006 and button 5008 are normally separate components. Button 5008 can be replaced with an invisible button, which gives laptop 5000 a more seamless and attractive look. The track surface 5006 itself can even be replaced with an invisible track pad, such as invisible track pad 310 discussed with reference to FIGS. 13-17.

In another embodiment, invisible controls can be added to laptop computer 5000 using the present invention. In one implementation, invisible control 5009 is shown in FIG. 26. Invisible control 5009 may be used, for example, to control music or video stored and played from computer 5000. Invisible control may have, for example, rewind 5010, play 5012, and fast forward 5014 invisible buttons and it may have increase 5016 and decrease 5018 invisible volume controls. Invisible holes may form patterns indicative of the functions of these buttons (e.g., rewind arrow, play arrow, fast forward arrow, volume increase plus, volume decrease minus, etc.). The holes may be backlit.

Invisible control 5009 may be a contextual control, meaning that the function of control 5009 is dependent upon an operating state of the device (in this case laptop computer 5000). The backlight may also be activated as a function of the operating state of the device. For example, control 5009 becomes visible automatically when a DVD is inserted into computer 5000, when a music CD is insert into computer 5000, or when iTunes® is active. The function of control 5009 is then adapted to either play the DVD, play the music CD, or to control iTunes® functions. iTunes® is a trade mark for a digital media player application created by Apple Inc. of Cupertino, Calif. In other implementations, invisible contextual controls (not shown) can be used to deactivate a camera, eject a disk or USB stick, or to illuminate the keyboard depending on the state of laptop 5000. Each of these invisible contextual controls can be made to become visible under appropriate situations (e.g., when the camera is on, the disk or USB stick is in, or if it is dark, respectively). Even the entire keyboard 5020 can be replaced with an array of invisible buttons. In fact, all of the conventional keys, buttons, track pads, etc. on a laptop or other electronic device can be replaced by invisible inputs according to the present invention. In this way, the truly seamless design has become a reality.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An electronic device, comprising:
   a frame having selectively visible holes formed in a top face and an interior wall formed within the frame, the interior wall separated from the top face by an interior space;
   a capacitive reference on an inner surface of the top face in the area of the selectively visible holes;
   a capacitor plate disposed on a surface of the interior wall opposite to the capacitive reference;
   a light source disposed in the interior space configured to shine through the selectively visible holes when lit; and
   a capacitive sensor electrically connected to the capacitive reference and to the capacitor plate,
   wherein deformation of the frame caused by pressure thereon in the area of the selectively visible holes causes a change in capacitance between the capacitive reference and the capacitor plate that is detected by the capacitive sensor and converted to an electrical signal.

2. The electronic device of claim 1, further comprising a dielectric medium disposed in the interior space wherein the dielectric medium comprises at least one of air, foam, rubber, or a dielectric gel.

3. The electronic device of claim 1, wherein the top face includes a first portion including the selectively visible holes that comprises at least one of a button or a switch.

4. The electronic device of claim 1, wherein the capacitive reference comprises conductive paint.

5. The electronic device of claim 4, wherein the conductive paint is printed on the inner surface of the top face.

6. The electronic device of claim 1, wherein the capacitor plate comprises conductive paint.

7. The electronic device of claim 6, wherein the conductive paint is printed on the surface of the interior wall.

8. The electronic device of claim 1, wherein the frame comprises aluminum.

9. The electronic device of claim 1, wherein the top face includes a first portion with the selectively visible holes and a second portion without the selectively visible holes that is flush with the first portion.

10. The electronic device of claim 1, wherein the light source is illuminated based at least on ambient lighting conditions, change in capacitance between the capacitive reference and the capacitor plate, detected motion, detected sound, or detected heat.

11. A method for configuring an electronic device with a selectively visible input, comprising:

forming a frame having a top face with selectively visible holes formed therein, an interior wall within the frame and separated from the top face, and an interior space between the top face and the interior wall;

disposing a dielectric medium in the interior space, a capacitive reference on an inner surface of the top face in an area of the selectively visible holes, a capacitor plate on a surface of the interior wall opposite to the capacitive reference, and a light source in the interior space that shines through the selectively visible holes when illuminated; and electrically connecting a capacitive sensor to the capacitive reference and the capacitor plate wherein deformation of the frame caused by pressure from an object placed thereon in the area of the selectively visible holes causes a change in capacitance between the capacitive reference and the capacitor plate that is detected by the capacitive sensor and converted to an electrical signal.

12. The method of claim 11, wherein the dielectric medium comprises at least one of air, foam, rubber, or a dielectric gel.

13. The method of claim 11, wherein the top face includes a first portion including the selectively visible holes that comprises at least one of a button or a switch.

14. The method of claim 11, wherein the capacitive reference comprises conductive paint.

15. The method of claim 14, wherein the conductive paint is printed on the inner surface of the top face.

16. The method of claim 11, wherein the capacitor plate comprises conductive paint.

17. The method of claim 16, wherein the conductive paint is printed on the surface of the interior wall.

18. The method of claim 11, wherein the frame comprises aluminum.

19. The method of claim 11, wherein the top face includes a first portion with the selectively visible holes and a second portion without the selectively visible holes that is flush with the first portion.

20. The method of claim 11, wherein the light source is illuminated based at least on ambient lighting conditions, change in capacitance between the capacitive reference and the capacitor plate, detected motion, detected sound, or detected heat.

* * * * *